(12) United States Patent
Nakamura et al.

(10) Patent No.: US 11,967,101 B2
(45) Date of Patent: Apr. 23, 2024

(54) METHOD AND SYSTEM FOR OBTAINING JOINT POSITIONS, AND METHOD AND SYSTEM FOR MOTION CAPTURE

(71) Applicant: THE UNIVERSITY OF TOKYO, Tokyo (JP)

(72) Inventors: Yoshihiko Nakamura, Tokyo (JP); Wataru Takano, Tokyo (JP); Yosuke Ikegami, Tokyo (JP); Takuya Ohashi, Tokyo (JP); Kazuki Yamamoto, Tokyo (JP); Kentaro Takemoto, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 640 days.

(21) Appl. No.: 17/274,744

(22) PCT Filed: Aug. 29, 2019

(86) PCT No.: PCT/JP2019/033859
§ 371 (c)(1),
(2) Date: Dec. 16, 2021

(87) PCT Pub. No.: WO2020/054442
PCT Pub. Date: Mar. 19, 2020

(65) Prior Publication Data
US 2022/0108468 A1    Apr. 7, 2022

(30) Foreign Application Priority Data

Sep. 10, 2018    (JP) .................................. 2018-168597

(51) Int. Cl.
*G06T 7/00*    (2017.01)
*G06T 7/73*    (2017.01)
(Continued)

(52) U.S. Cl.
CPC .............. *G06T 7/73* (2017.01); *G06V 10/242* (2022.01); *G06V 40/103* (2022.01); *G06T 2207/30196* (2013.01)

(58) Field of Classification Search
CPC ........ G06N 3/047; G06N 5/01; G06N 3/0464; G06N 20/00; G06N 3/045; G06N 3/084;
(Continued)

(56) References Cited

U.S. PATENT DOCUMENTS

2008/0112592 A1    5/2008    Wu et al.
2012/0057791 A1*   3/2012    Mitarai ................. G06F 18/214
                                                         382/190
(Continued)

FOREIGN PATENT DOCUMENTS

JP    2007333690 A    12/2007

OTHER PUBLICATIONS

International Search Report in the international application No. PCT/JP2019/033859, dated Nov. 19, 2019.
(Continued)

*Primary Examiner* — Quan M Hua
(74) *Attorney, Agent, or Firm* — Ladas & Parry, LLP

(57) ABSTRACT

The present invention provides a motion capture with a high accuracy which can replace an optical motion capture technology, without attaching optical markers and sensors to a subject. A subject with an articulated structure has a plurality of feature points in the body of the subject including a plurality of joints wherein a distance between adjacent feature points is obtained as a constant. A spatial distribution of a likelihood of a position of each feature point is obtained based on a single input image or a plurality of input images taken at the same time. One or a plurality of position candidates corresponding to each feature point are obtained based on the spatial distribution of the likelihood of the
(Continued)

position of each feature point. Each join angle is obtained by performing an optimization calculation based on inverse kinematics using the candidates and the articulated structure. Positions of the feature points including the joints are obtained by performing a forward kinematics calculation using the joint angles.

23 Claims, 11 Drawing Sheets

(51) Int. Cl.
  *G06V 10/24* (2022.01)
  *G06V 40/10* (2022.01)
(58) Field of Classification Search
  CPC . G06T 2207/20081; G06T 2207/20084; G06T 7/11; G06T 7/0012; G06T 2207/10016; G06T 7/73; G06T 7/10; G06T 7/174; G06T 7/74; G06T 7/194; G06T 2207/10028; G06T 2207/10088; G06T 7/70; G06T 7/0014; G06T 7/0004; G06T 2207/10056; G06T 2207/20021; G06T 2200/04; G06T 7/33; G06T 7/337; G06V 10/82; G06V 10/267; G06V 10/25; G06V 10/44; G06V 10/26; G06V 10/40; G06V 20/46; G06V 10/454; G06V 10/764; G06V 2201/031; G06F 18/214; G06F 18/253; G06F 18/24; G06F 18/2148; G06F 18/2415; G06F 18/213; G06F 18/241; G06F 18/2115
  See application file for complete search history.

(56) References Cited

U.S. PATENT DOCUMENTS

| | | | |
|---|---|---|---|
| 2018/0322680 A1* | 11/2018 | Mcelmurray | G06V 20/40 |
| 2019/0266748 A1* | 8/2019 | Ahmad | G05D 1/024 |

OTHER PUBLICATIONS

Written Opinion of the International Searching Authority in the international application No. PCT/JP2019/033859, dated Nov. 19, 2019, with English translation provided by Google Translate.
Yamamoto, Kazuki et al., "Video Motion Capture based on Inverse Kinematics using the High-order Information Moments", Abstract, Lecture proceedings of 2019 JSME annual Conference on Robotics and Mechatronics, p. 1-4, Jun. 2018.
Zhengyou Zhang, "Microsoft Kinect Sensor and Its Effect" Multimedia at Work, IEEE Computer Society, Feb. 2012.
Shotton, Jamie et al., "Real-Time Human Pose Recognition in Parts from Single Depth Images", Microsoft Research Cambridge & Xbox Incubation, p. 1-8, 2011.
Tong, Jing et al., "Scanning 3D Full Human Bodies using Kinects," IEEE Transactions on Visualization and Computer Graphics, Apr. 2012.
Spinello, Luciano et al., "A Layered Approach to People Detection in 3D Range Data", Proceedings of the Twenty-Fourth AAAI Conference on Artificial Intelligence (AAAI-10), Association for the Advancement of Artificial Intelligence, p. 1625-1630, 2010.
Dewan, Ayush et al., "Motion-based Detection and Tracking in 3D LiDAR Scans", IEEE International Conference on Robotics and Automation (ICRA), pp. 4508-4513, 2016.
C. J. Taylor, "Reconstruction of articulated objects from point correspondences in a single uncalibrated image," Computer Vision and Image Understanding, vol. 80, Issue 3, pp. 349-363, Dec. 2000.
Akhter, Ijaz "Pose-conditioned joint angle limits for 3D human pose reconstruction," 2015 IEEE Conference on Computer Vision and Pattern Recognition (CVPR), pp. 1446-1455, 2015.
Mehta, Dushyant, et al. "Vnect: Real-time 3d human pose estimation with a single rgb camera." ACM Transactions on Graphics (TOG), p. 1-14, 2017.
Kanazawa, Angjoo, et al. "End-to-end recovery of human shape and pose." Proceedings of the IEEE Conference on Computer Vision and Pattern Recognition, p. 7122-7131, 2018.
Sun, Xiao, et al. "Compositional human pose regression." Proceedings of the IEEE International Conference on Computer Vision. p. 2602-2611, 2017.
Wei, S. E., Ramakrishna, V., Kanade, T., & Sheikh, Y. (2016). Convolutional pose machines. In Proceedings of the IEEE conference on Computer Vision and Pattern Recognition (pp. 4724-4732).
Cao, Z., Simon, T., Wei, S. E., & Sheikh, Y. (2017). Realtime multi-person 2d pose estimation using part affinity fields. In Proceedings of the IEEE conference on computer vision and pattern recognition (pp. 7291-7299).
Nakamura, Yoshihiko, et al. "Somatosensory computation for man-machine interface from motion-capture data and musculoskeletal human model." IEEE Transactions on Robotics 21.1 (2005): 58-66.
Ayusawa, K., & Nakamura, Y. (2012, October). Fast inverse kinematics algorithm for large DOF system with decomposed gradient computation based on recursive formulation of equilibrium. In 2012 IEEE/RSJ International Conference on Intelligent Robots and Systems (pp. 3447-3452). IEEE.

* cited by examiner

METHOD AND SYSTEM FOR OBTAINING JOINT POSITIONS, AND METHOD AND SYSTEM FOR MOTION CAPTURE

CROSS-REFERENCE TO RELATED APPLICATIONS

This application is the U.S. national phase of PCT Application No. PCT/JP2019/033859 filed on Aug. 29, 2019, which claims priority to the Japanese patent application No. 2018-168597 filed in Japan on Sep. 10, 2018, the disclosures of which are incorporated herein by reference in their entireties.

TECHNICAL FIELD

The present invention relates to motion capture, and more particularly to acquisition of joint positions of a subject, acquisition of a pose of a subject, and acquisition and analysis of motion of a subject.

BACKGROUND OF THE INVENTION

Motion capture is an indispensable technology for acquiring and analyzing human motion, and is widely used in fields such as sports, medical, robotics, computer graphics, and computer animation. Optical motion capture is well known as a motion capture technique. According to the optical motion capture, a plurality of optical markers coated with retroreflective material are attached to the body of a subject, a plurality of cameras such as an infrared camera take images of the motion of the subject, and the motion of the subject is obtained from the movement trajectory of the optical markers.

As another motion capture technique, it is also known that inertial sensors such as an acceleration sensor, a gyroscope, or a geomagnetic sensor are attached to the body of a subject to acquire the motion data of the subject.

The optical method and the method using the inertial sensor can acquire accurate motion data, but since it is necessary to attach multiple markers or multiple sensors to the subject body, the preparation for the motion capture requires time and manpower, and natural motion may be hindered by constraint of the movement of the subject. Further, these technologies are not widely available due to expensiveness of the system and the device. According to the optical motion capture, the capture location is limited so that it is difficult to obtain motion data for the motion performed outdoors or in a wide space.

Markerless motion capture, which does not require attachment of optical markers or sensors, is also known. Non-Patent Documents 1 to 5 can be exemplified as such motion capture using a camera and a depth sensor. However, according to this technique, depth data is obtained by a laser which has a low temporal/spatial resolution performance, and it is difficult to measure a subject that moves outdoors, far away from the camera, or at a high speed.

Thanks to improvements in a technique and accuracy of the image recognition by deep learning, video motion capture, which acquires motion data by analyzing an RGB image from a single viewpoint, has also been proposed (Non-Patent Documents 6 to 11). This technique can be used even under conditions such as outdoors and distant places, and the temporal and spatial resolution can be increased at a relatively low cost by selecting the performance of the camera. However, in the measurement from one viewpoint, it is often difficult to estimate the pose of the subject due to an occlusion, and an accuracy is not as good as the optical motion capture using a plurality of cameras.

There has been research on generating a heatmap representing a spatial distribution of a likelihood of a joint position by locating a human figure in a single video image. One representative study is OpenPose (Non-Patent Document 12). According to OpenPose, it is possible to estimate a plurality of feature points (keypoints) such as wrists and shoulders of multiple people in realtime from a single RGB image. This technique has been developed based on the research conducted by Wei et al. (Non-patent document 13) to estimate each joint position by generating Part Confidence Maps (PCM) from a single RGB image by using CNN and the research conducted by Cao et al. (Non-patent document 14) to apply and extend the realtime estimation of joint positions to multiple people by calculating Part Affinity Fields (PAF) which are vector fields representing a direction of adjacent joints. In addition, various methods have been proposed as a technique for generating a heatmap (corresponding to PCM in OpenPose), which is a spatial distribution of a likelihood representing the probability of each joint position. A competition for the accuracy of the human joint position estimation from an input image has been also held (Non-Patent Document 15).

However, a method of three-dimensionally reconstructing the joint position using the heatmap information which can provide motion measurement with a high accuracy similar to that with an optical motion capture has not been realized.

CITATION LIST

Non-Patent Document

[1] Z. Zhang. Microsoft kinect sensor and its effect. IEEE MultiMedia, 19(2):4-10, February 2012.
[2] J. Shotton, A. Fitzgibbon, M. Cook, T. Sharp, M. Finocchio, R. Moore, A. Kipman, and A. Blake. Realtime human pose recognition in parts from single depth images. In Proceedings IEEE Conference on Computer Vision and Pattern Recognition. CVPR 2011, CVPR '11, pages 1297-1304, Washington, DC, USA, 2011. IEEE Computer Society.
[3] J. Tong, J. Zhou, L. Liu, Z. Pan, and H. Yan. Scanning 3d full human bodies using kinects. IEEE Transactions on Visualization and Computer Graphics, 18(4):643-650, April 2012.
[4] Luciano Spinello, Kai O. Arras, Rudolph Triebel, and Roland Siegwart. A layered approach to people detection in 3d range data. In Proceedings of the Twenty-Fourth AAAI Conference on Artificial Intelligence, AAAI'10, pages 1625-1630. AAAI Press, 2010.
[5] A. Dewan, T. Caselitz, G. D. Tipaldi, and W. Burgard. Motion-based detection and tracking in 3d lidar scans. In 2016 IEEE International Conference on Robotics and Automation (ICRA), pages 4508-4513, May 2016.
[6] C. J. Taylor. Reconstruction of articulated objects from point correspondences in a single uncalibrated image. In Proceedings IEEE Conference on Computer Vision and Pattern Recognition. CVPR 2000, volume 1, pages 677-684 vol. 1, 2000.
[7] I. Akhter and M. J. Black. Pose-conditioned joint angle limits for 3d human pose reconstruction. In Proceedings IEEE Conference on Computer Vision and Pattern Recognition. CVPR 2015, pages 1446-1455, June 2015.
[8] Dushyant Mehta, Helge Rhodin, Dan Casas, Oleksandr Sotnychenko, Weipeng Xu, and Christian Theobalt. Monocular 3d human pose estimation using transfer learning and improved CNN supervision. The Computing Research Repository, abs/1611.09813, 2016.
[9] Dushyant Mehta, Srinath Sridhar, Oleksandr Sotnychenko, Helge Rhodin, Mohammad Shaei, Hans-Peter Seidel, Weipeng Xu, Dan Casas, and Christian Theobalt. Vnect: Realtime 3d human pose estimation with a single RGB camera.
[10] Angjoo Kanazawa, Michael J. Black, David W. Jacobs, and Jitendra Malik. End-to-end recovery of human shape and pose. arXiv:1712.06584, 2017.
[11] Xiao Sun, Jiaxiang Shang, Shuang Liang, and Yichen Wei. Compositional human pose regression. The Computing Research Repository, abs/1704.00159, 2017.
[12] Openpose. https://github.com/CMU-Perceptual-Computing-Lab/openpose.
[13] Shih-En Wei, Varun Ramakrishna, Takeo Kanade, and Yaser Sheikh. Convolutional pose machines. In Proceedings IEEE Conference on Computer Vision and Pattern Recognition. CVPR 2016, 2016.
[14] Zhe Cao, Tomas Simon, Shih-En Wei, and Yaser Sheikh. Realtime multi-person 2d pose estimation using part affinity fields. In Proceedings IEEE Conference on Computer Vision and Pattern Recognition. CVPR 2017, 2017.
[15] http://cocodataset.org/#keypoints-leaderboard
[16] Y. Nakamura, K. Yamane, Y. Fujita, and I. Suzuki. Somatosensory computation for man-machine interface from motion-capture data and musculoskeletal human model. Trans. Rob., 21(1):58-66, February 2005.
[17] K. Ayusawa and Y. Nakamura. Fast inverse kinematics algorithm for large dof system with decomposed gradient computation based on recursive formulation of equilibrium. In 2012 IEEE/RSJ International Conference on Intelligent Robots and Systems, pages 3447-3452, October 2012.

SUMMARY OF THE INVENTION

An object of the present invention is to provide markerless motion measurement with high accuracy regardless of indoors, outdoors, or clothing.

The present invention relates to a method of obtaining joint positions of a subject with an articulated structure, the subject having a plurality of feature points in the body of the subject including a plurality of joints wherein a distance between adjacent feature points is obtained as a constant,
  obtaining a spatial distribution of a likelihood of a position of each feature point based on a single input image or a plurality of input images taken at the same time;
  obtaining one or a plurality of position candidates corresponding to each feature point based on the spatial distribution of the likelihood of the position of each feature point;
  obtaining each joint angle by performing an optimization calculation based on inverse kinematics using the candidates and the articulated structure; and
  obtaining positions of the feature points including the joints by performing a forward kinematics calculation using the joint angles.

In one aspect, the obtaining position candidates for each feature point comprises obtaining one or a plurality of position candidates for each feature point in a frame at time t+1 using the spatial distribution of the likelihood obtained in the frame at time t+1 by setting a neighboring space around the position of each feature point obtained at a frame at time t as a search range.

In one aspect, the search range comprises one or more neighboring spaces around the position of each feature point obtained at one or more frames prior to the frame at time t and/or one or more neighboring spaces around the position of each feature point obtained at one or more frames after the frame at time t+1 in addition to or replace of the neighboring space around the position of each feature point obtained in the frame at time t.

In one aspect, the search range is a set of a predetermined number of points three-dimensionally distributed at a predetermined interval around the position of the feature point.

In one aspect, the spatial distribution of the likelihood is used in the optimization calculation based on inverse kinematics.

In one aspect, the method further comprises:
  smoothing the positions of feature points in a temporal direction using a plurality of positions of the feature points obtained at a plurality of the other frames; and
  obtaining each joint angle of the subject by performing the optimization calculation based on inverse kinematics using the smoothed positions of feature points and the articulated structure of the subject.

In one aspect, the positions of the feature points including the joints are obtained by performing the forward kinematics calculation using the joint angles.

In one aspect, the method further comprises a preprocessing step based on information obtained at a frame prior to the input image,
  the preprocessing step comprising at least one of:
  (a) rotation of the input image;
  (b) trimming and/or reducing of the input image;
  (c) masking of the input image;
  (d) selection of the input image by selecting a camera; and
  (e) stitching of the input image.

In one aspect, the preprocessing step comprises the rotation of the input image, and the preprocessing step comprising:
  obtaining an inclination to an upright pose of the body of the subject at the frame prior to the input image;
  rotating the input image in accordance with the inclination to obtain an upright pose or a nearly upright pose;
  obtaining the spatial distribution of the likelihood based on the rotated image; and
  rotating the rotated image with the spatial distribution of the likelihood back to the original input image.

In one aspect, the invention is provided as a method for motion capture comprising obtaining time series data of joint angles and joint positions by obtaining joint angles and joint positions in each frame by using the method for obtaining joint positions according to the above method for obtaining a joint position.

The present invention relates to a system for obtaining joint positions of a subject comprising a memory and a processor,
  the memory configured to store a file defining an articulated structure comprising a plurality of feature point in the body of the subject including a plurality of joints and a distance between adjacent feature points as a constant,
  the processor configured to:
  obtain a spatial distribution of a likelihood of a position of each feature point based on a single input image or a plurality of input images taken at the same time;
  obtain one or a plurality of position candidates corresponding to each feature point based on the spatial distribution of the likelihood of the position of each feature point;

obtain each joint angle by performing an optimization calculation based on inverse kinematics using the candidates and the articulated structure; and obtain positions of the feature points including the joints by performing a forward kinematics calculation using the joint angles.

In one aspect, the invention is provided as a motion capture system comprising the above system for obtaining joint positions, wherein joint angles and joint positions are obtained in each frame to obtain time series data of the joint angles and the joint positions.

In one aspect, the invention is provided as a computer program that causes a computer to function as a memory and processor of the above system, or a computer readable medium in which the computer program is stored.

The invention makes it possible to perform markerless motion capture based on camera images, regardless of indoors, outdoors, or clothing. Smooth motion measurement which is similar to that of the conventional optical motion capture can be conducted by performing 3D reconstruction for the joint position estimated from the camera image using deep learning while considering the articulated structure (for example, a skeletal structure) of the subject and the continuity of motion.

DESCRIPTION OF THE EMBODIMENTS

[A] Overall Configuration of Motion Capture System of Embodiment

Figure 1:
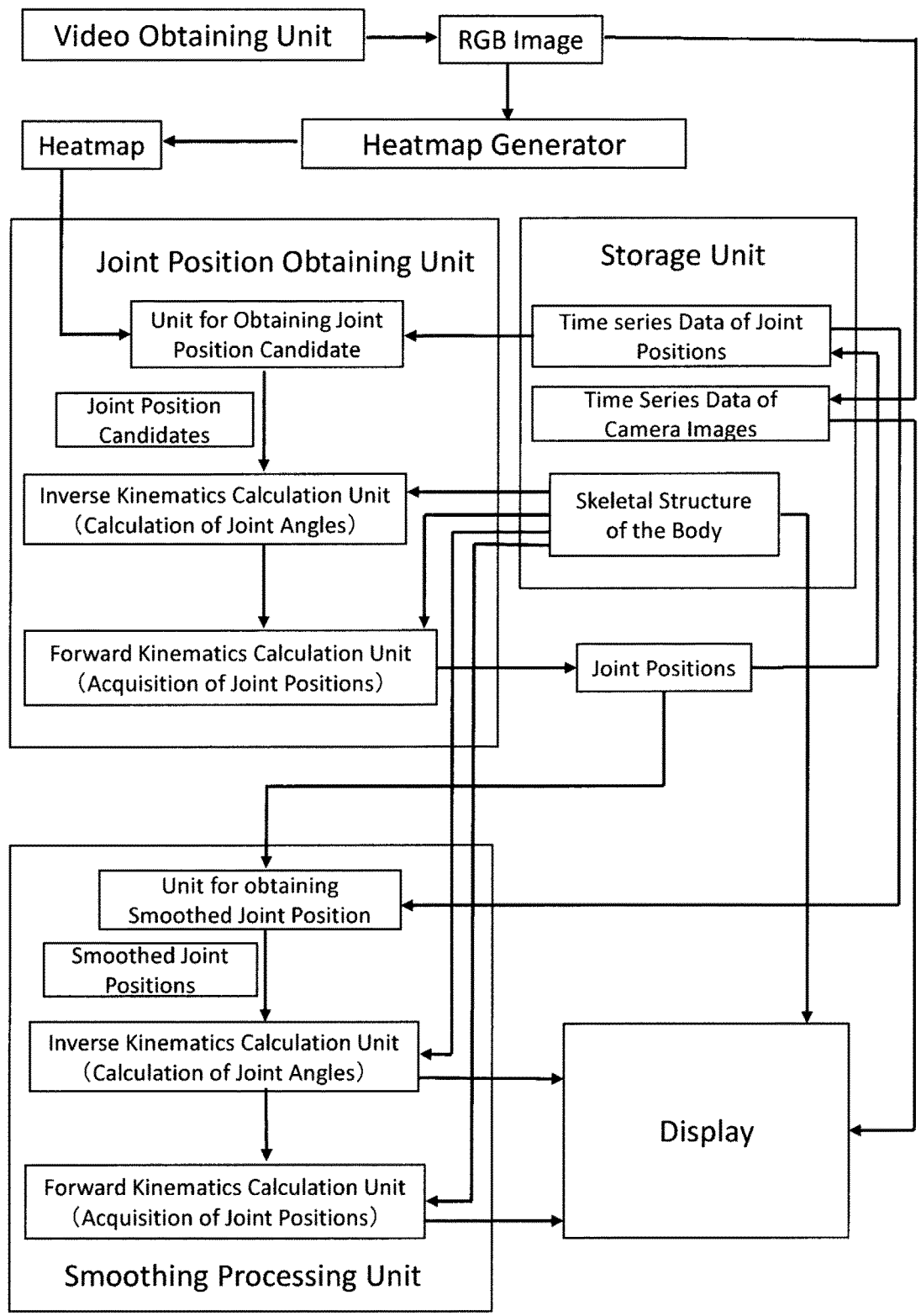
FIG. 1 shows an overall view of a motion capture system.

As shown in FIG. 1, a motion capture system of the present embodiment comprises a video obtaining unit for obtaining a video of a subject, a heatmap generating unit for obtaining heatmap information presenting the degree of likelihood of a position for each feature point (keypoint) including joints with a color intensity based on the images obtained by the video obtaining unit, a unit for obtaining joint positions of the subject by using the heatmap information obtained at the heatmap generating unit, a smoothing processing unit for smoothing the joint positions obtained by the unit for obtaining joint positions, a storage unit for storing a skeletal structure of the body of the subject, time series data of images obtained at the video obtaining unit, time series data of the joint positions obtained at the unit for obtaining joint positions, and so forth, and a display for displaying the image of the subject captured by the video obtaining unit, the skeletal structure corresponding to the pose of the subject, and so forth. Since a feature point in the body of the subject is primarily a joint, the word "joint" is used in the description and drawings for representing a feature point, and it is noted that description to "joint" can be applied to a feature point other than the joints.

In the embodiment, hardware of the motion capture system comprises a plurality of cameras constituting the video obtaining unit, one or a plurality of local computers for receiving camera images, and one or a plurality of computers connected to the local computers via a network, and one or a plurality displays. In one embodiment, one local computer corresponds to one camera to obtain a camera image and the local computer also operates as the heatmap generating unit, and one or a plurality of computers connected to the local computers via a network operate as the unit for obtaining joint positions, the smoothing processing unit, and the storage unit. In another embodiment, a local computer which connected to a camera reduces a size of an image if necessary and send the reduced image via a network to a computer which constitutes the unit for obtaining joint positions, the smoothing processing unit, and the storage unit. Each computer may comprise an input port, a processor, a memory (RAM, ROM) and an output port.

The cameras are synchronized so that camera images taken at the same time are sent to corresponding heatmap generating unit, and a heatmap is generated by the heatmap generating unit. The heatmap represents a spatial distribution of a likelihood of a position of a feature point in the body. The generated heatmap information is sent to the unit for obtaining joint positions and then joint positions are obtained by the unit for obtaining joint positions. The obtained joint position data is stored in the storage unit as time series data of the joint positions. The obtained joint position data is sent to the smoothing processing unit to obtain smoothed joint positions and joint angles. A pose of the subject can be determined by the smoothed joint positions and joint angles. The skeletal structure of the body of the subject and the motion of the subject comprised of time series data of the pose may be displayed on the display.

The video obtaining unit comprises a plurality of cameras which are synchronized by using an external synchronized signal generator for example. A method for synchronizing camera images is not limited. The multiple cameras are located to surround the subject and a multiview video of the subject can be obtained by capturing the subject by all or part of the cameras at the same time. Each camera acquires an RGB image with a size of 1024×768 at 60 fps for example, and the RGB image is sent to the heatmap generating unit in realtime or non-realtime. When the image data obtained at the video obtaining unit is sent to the heatmap generating unit via a network, the image data may by reduced or encrypted depending on the contents of the image or a purpose of use. Time series data of the images may be stored in the storage unit. The time series data of the images may be displayed on the display in realtime or non-realtime as a motion video.

In the present embodiment, the video obtaining unit comprises a plurality of cameras and sends a plurality of camera images taken at the same time to the heatmap generating unit. The heatmap generating unit generates a heatmap based on an input image from the video obtaining unit. The video obtaining unit may be comprised of a single camera. In this case, the single camera may output a camera image with depth information. When the heatmap generating unit generates a heatmap from a single camera image with depth information, the heatmap is generated by using a convolutional neural network (CNN) and such which has trained with the probability of a 3D position of a feature point in the body based on the single image. There has been research on generating three-dimensional pose of human from a single input image (non-patent document 9) and the heatmap can be generated from the single camera image obtained by the single camera using such research for example. In the present embodiment, the camera of the video obtaining unit is a fixed camera, but a movable camera may be used. In case of using the movable camera, camera calibration should be parallelly performed in each frame by using SLAM (Simultaneous Localization and Mapping) and such. Motion of the movable camera may include rotation, liner motion, and an arbitrary two-dimensional or three-dimensional movement (including flying using a drone and such).

The number of subjects in one image is not limited. In one embodiment, the camera captures motions of a plurality of humans and each image may include a plurality of humans. In each image, joint positions of one or more humans selected from the plurality of humans are obtained. If the single image includes a plurality of humans, joint positions for each human can be simultaneously obtained by using PAF and PCM for example. Alternatively, joint positions for each human are identified at the beginning of the motion measurement so that each human can be identified by following the joint positions by using continuity between frames.

In obtaining a motion by a motion capture system, a subject comprises a link structure or an articulated structure. Typically, the subject is human, and the articulated structure is a skeletal structure of the body. Provided that learning date used for the heatmap generating unit should be prepared corresponding to a subject, the motion capture can be applied to a subject other than human (such as an animal other than human or a robot). In addition, a subject is not limited to the whole body of the human but may be a part of the body.

The storage unit stores acquired data and processed data. For example, the storage unit stores time series data of the images taken by the video obtaining unit, and joint position data and joint angle data obtained by the unit for obtaining joint position. The storage unit may further store smoothed joint position data and smoothed joint angle data obtained by the smoothing processing unit, heatmap data generated by the heatmap generating unit and any other data generated during processing.

Figure 10A:
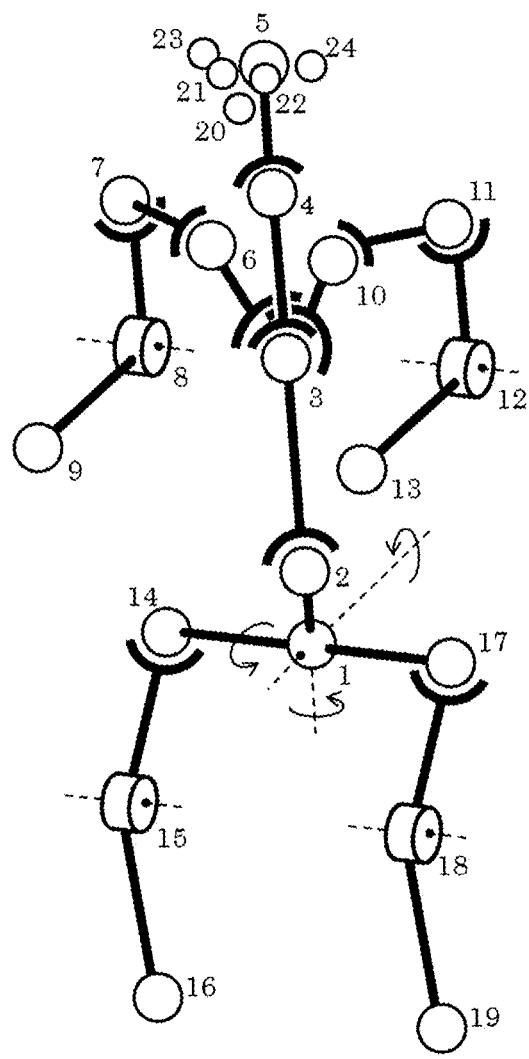
FIG. 10A (a left figure) shows a skeleton model of the present embodiment.

The storage unit further stores data determining the skeletal structure of the body of the subject. The data comprises a file for defining a skeletal mode of the body and distance data between the adjacent joints of the subject. The joint angles and the pose of the subject are determined by the joint positions in the skeletal model, which is an articulated object. The skeletal model used in the present embodiment is shown in FIG. 10A. The skeletal model shown in FIG. 10A has 40 DOFs (degrees of freedom), but this skeletal mode is illustrative. As will be described later, a constant representing the distance between adjacent joints of the subject can be obtained at the time of initial setting of motion capture. The distance between the adjacent joints of the subject may be obtained prior to motion capture by another method, or the already acquired distance may be used. According to the present embodiment, by using the skeletal structure data of the subject body, it is possible to give a constraint condition unique to the skeletal structure in calculating the joint positions in which the distance between adjacent joints does not change with time.

Figure 2:
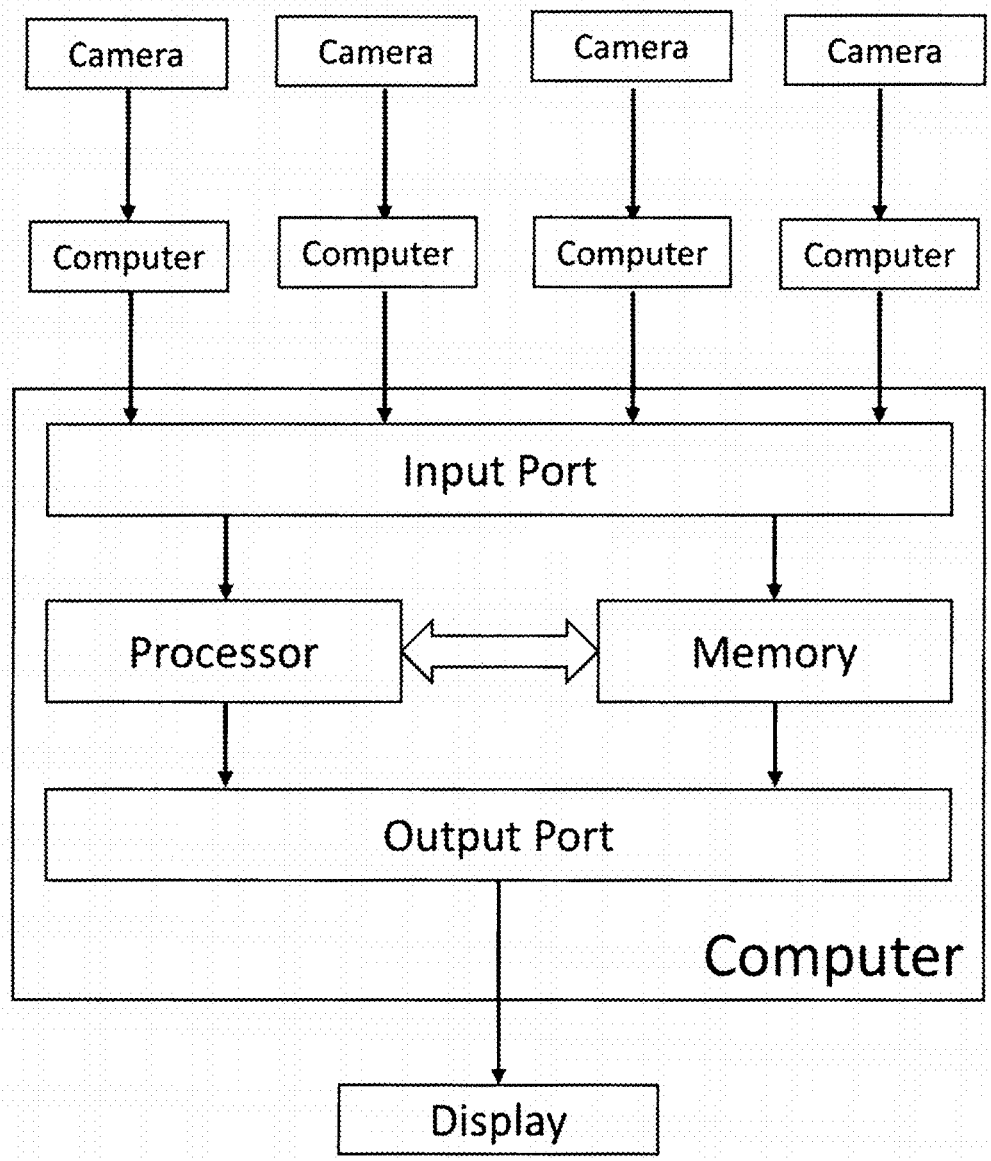
FIG. 2 shows a schematic diagram showing a hardware configuration of a motion capture system.

The display displays the motion video of the subject obtained by the video obtaining unit, time series skeletal images showing the pose of the subject obtained by motion capture and such. For example, skeletal image (pose of subject) data is generated in each frame by the processor of the computer by using a subject-dependent skeletal structure and obtained time series data of the joint angles and joint positions, and the skeletal image data is outputted at a predetermined frame rate to the display to show the motion video. FIG. 2 shows a display as a typical example of an output device, but the output device is not limited to the display but may be other devices such as a computer for analyzing purpose.

[B] Heatmap Generating Unit

A heatmap generating unit generates a two-dimensional or three-dimensional spatial distribution of a likelihood a position of a feature point (keypoint) in the body including joints based on an input image and represents the spatial distribution of the likelihood in a heatmap manner. The heatmap shows varying values spreading over a space by color intensity in the space like a temperature distribution and enables visualization of the likelihood. A likelihood value may be between 0 and 1 for example, but the scale of the likelihood value is arbitrary. In the present embodiment, it is sufficient that the heatmap generating unit obtains the spatial distribution of the likelihood of the positions of the feature points in the body including the joints, or heatmap (each pixel of the image representing the likelihood value), and it is not necessary to display the heatmap.

The heatmap generating unit estimates the position of the feature point (typically joint position) on the subject body from a single input image as a heatmap by typically using a convolutional neural network (CNN). The convolutional neural network (CNN) comprises an input layer, an intermediate layer (a hidden layer) and an output layer and the intermediate layer is configured by deep learning using training data for two-dimensional mapping of a feature point to an existing position on an image.

In the embodiment, the likelihood obtained by the heatmap generating unit is given to each pixel on a 2D image, and the heatmap information from a plurality of viewpoints is integrated to obtain information on the probability of three-dimensionally existing position of the feature points. The likelihood obtained by the heatmap generating unit is the likelihood $\lambda=\lambda(x, y, fx(X, Y, Z), fy(X, Y, Z))$ where 2D information is assigned to each point $(x, y)$ in the 2D space using the 3D coordinates $(X, Y, Z)$, and the likelihood $\lambda=\lambda(x, y, X, Y, Z)$ where 3D information is assigned to each point $(x, y)$ in the 2D space using the 3D coordinates $(X, Y, Z)$.

OpenPose (Non-Patent Document 12), which is an open source software, can be used as the heatmap generating unit. According to OpenPose, 18 keypoints in the body are set (see FIG. 10B), Specifically, the 18 feature points consist of 13 joints, a nose, left and right eyes, and left and right ears. OpenPose uses a trained convolutional neural network (CNN) to generate Part Confidence Maps (PCM) of 18 keypoints in the body from a single RGB image offline or in realtime to display PCM in a heatmap format. In the present specification, the term PCM may be used occasionally for a spatial distribution of a likelihood of a position of a feature point, or a heatmap occasionally, however, it should be noted that an index representing the spatial distribution of the likelihood of the position of feature point in the body including each joint is not limited to PCM.

OpenPose is applied to each RGB image obtained from a plurality of synchronized cameras to generates Part Confidence Maps (PCM) for 18 feature points. In the embodiment, one local computer that generates a heatmap is provided for each camera, and the heatmaps are generated by parallel calculation. If the number of cameras increases, the parallel calculation enables to suppress an increase in a calculation amount. The heatmap data is transmitted from the heatmap generating unit to the unit for obtaining joint positions (computer) via a network. When transmitting the heatmap data, the heatmap data may be compressed or encrypted if necessary. Since the heatmap data is a sparse image, the generated heatmap data can be efficiently compressed. In addition, since the heatmap data does not include personally identifiable information, if the calculation up to the heatmap generation is performed on the local computer which is directly connected to the camera, only the heatmap data that does not include personal information can be transmitted via the network, and security is enhanced.

A method other than OpenPose can be used for the heatmap generating unit. Various methods have been proposed as techniques for generating a heatmap showing the probability of the position of a feature point on the subject body. For example, a method that has won a high ranking in the COCO Keypoints challenge (Non-Patent Document 15) can be adopted. Alternatively, a learning device for the heatmap generating unit may be created independently to construct a convolutional neural network (CNN).

[C] Initial Setting of Motion Capture System of Embodiment

Figure 3:
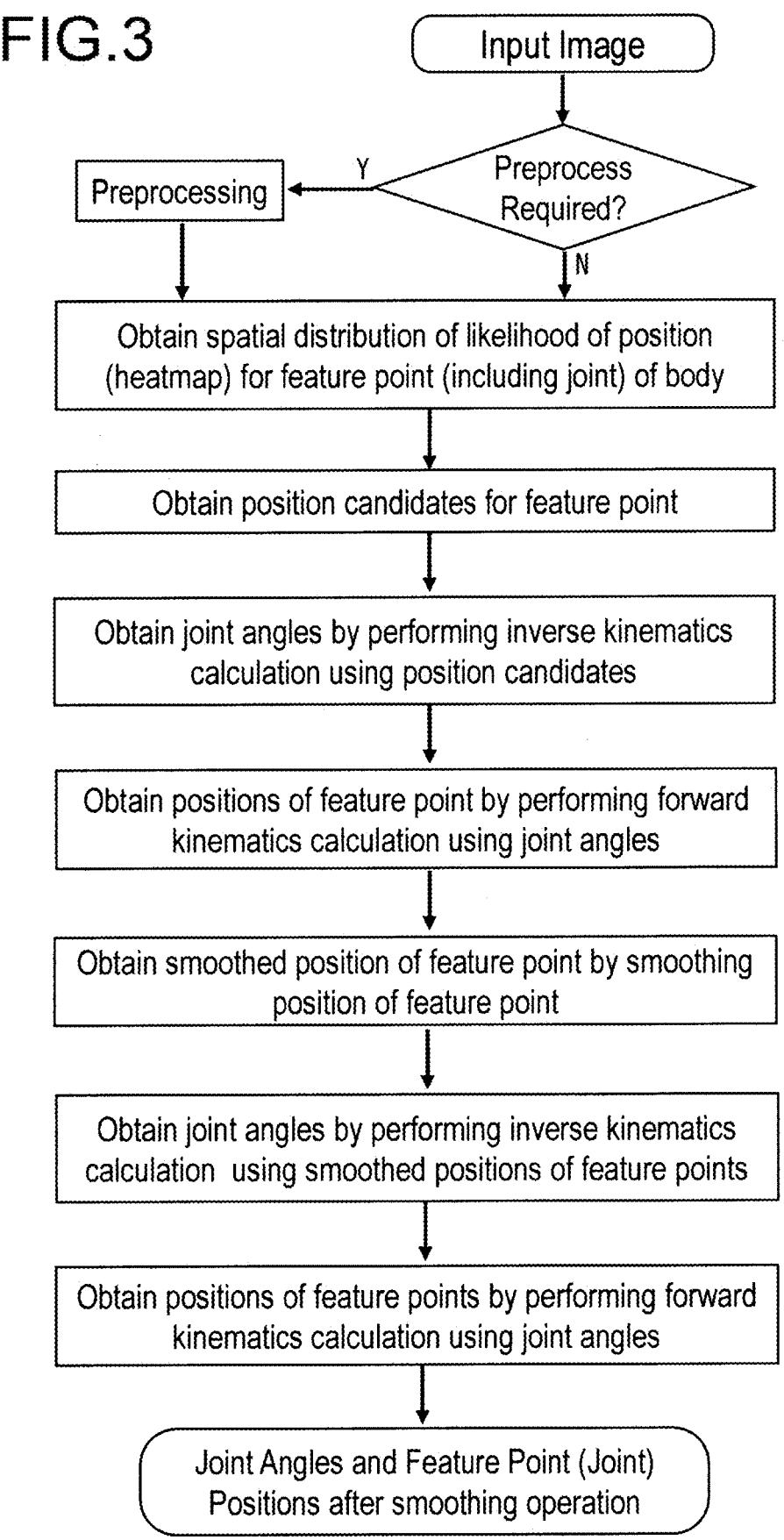
FIG. 3 is a flowchart showing processing steps based on an input image.
Figure 4:
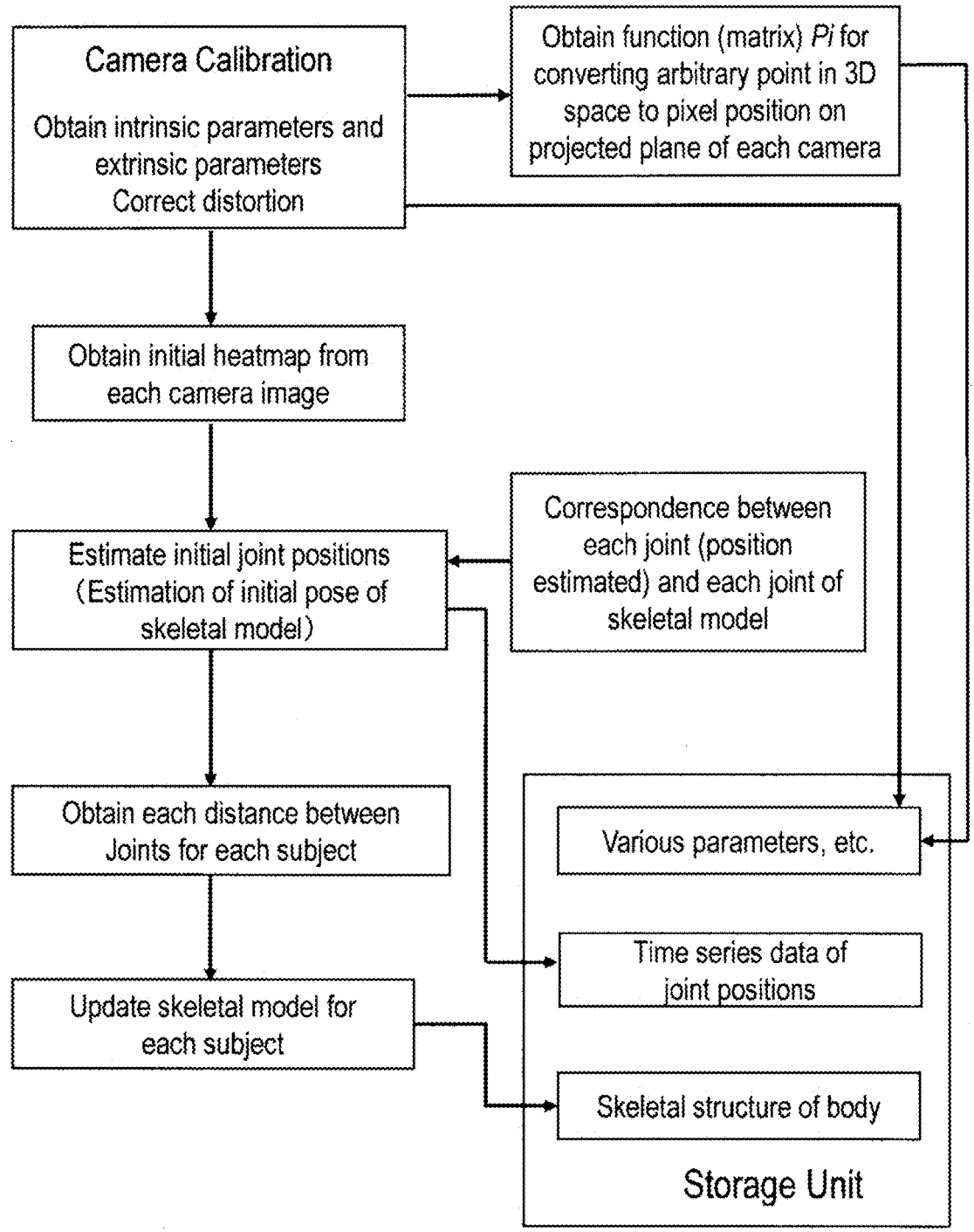
FIG. 4 is a flowchart showing processing steps for camera calibration and acquisition of an initial pose and a distance between joins of a skeleton model.
Figure 5:
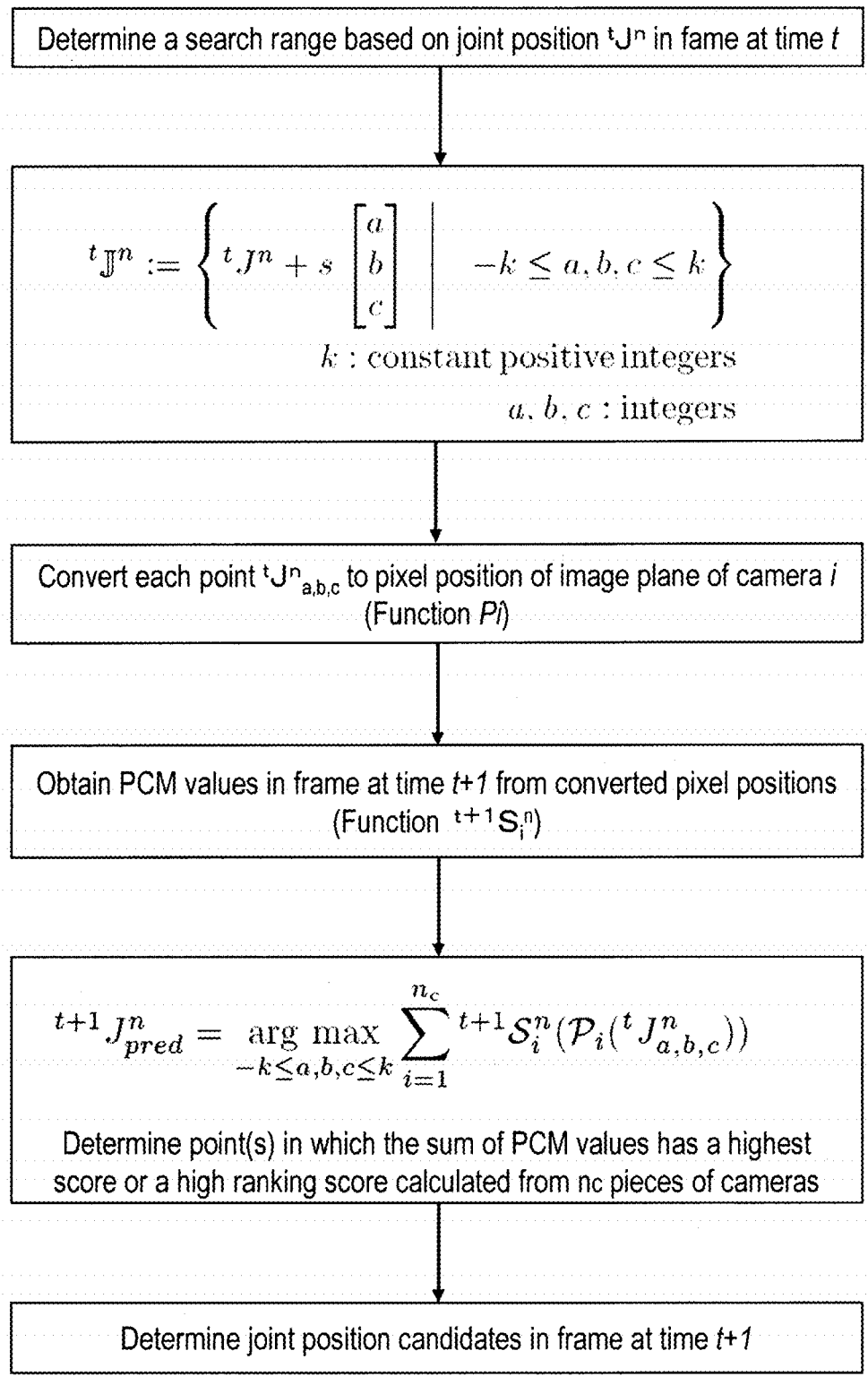
FIG. 5 is a flowchart showing processing steps performed by a unit for obtaining a joint position candidate.

Referring to FIG. 3, camera calibration, acquisition of initial pose of the skeletal model, and acquisition of a distance between joints of the subject for the motion capture system of the present embodiment will be explained.

[C-1] Camera Calibration

Intrinsic parameters and extrinsic parameters are obtained from calibration images and distortion of the input image is corrected from the camera parameters. Camera calibration is well-known in the art and detail explanation will be omitted. The camera parameters including the intrinsic parameters and extrinsic parameters are stored in the storage unit.

A function (matrix) $P_i$ for transforming an arbitrary three-dimensional point to a pixel position on a projected plane of camera "i" is derived by using a focal distance, an optic center, a center of image (intersection of optical axis and projected plane), the intrinsic parameters and extrinsic parameters and such. The function $P_i$ is stored in the storage unit. When a movable camera is used, camera calibration may be parallelly conducted by SLAM (Simultaneous Localization and Mapping) and such to obtain the function (matrix) $P_i$ at every frame. The camera parameters and the function (matrix) $P_i$ obtained by the calibration may be stored in the storage unit.

Figure 10B:
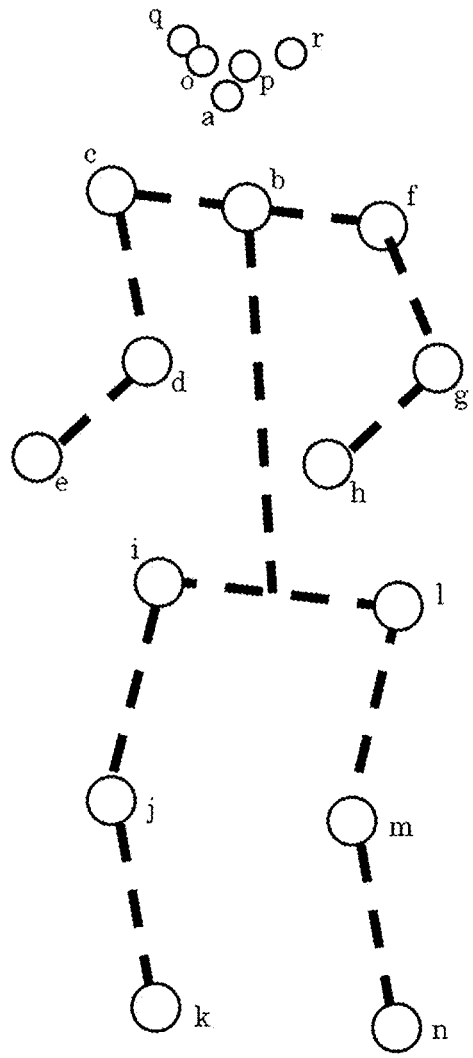
FIG. 10B (a right figure) shows keypoints provided by OpenPose.

[C-2] Correspondence Between Skeletal Model and Feature Points in Body on which Heatmap is Generated Each joint of the skeletal model (FIG. 10A) corresponds to each feature point in the body adopted by the heatmap generating unit (FIG. 10B, except a, o, p, q, r). The correspondence is shown in table 1.

TABLE 1

Correspondence of Human Model to OpenPose

| 40DOF Human Model (FIG. 10 left) | | | OpenPose (FIG. 10 right) |
|---|---|---|---|
| Joint Number | Name | DOF | Reference |
| 1 | Pelvis (Base body) | 6 | — |
| 2 | Waist | 3 | — |
| 3 | Chest | 3 | — |
| 4 | Neck | 3 | b |
| 5 | Head | 3 | — |
| 6 | Right Clavicle | 3 | — |
| 7 | Right Shoulder | 3 | c |
| 8 | Right Elbow | 1 | d |
| 9 | Right Wrist | 0 | e |
| 10 | Left Clavicle | 3 | — |
| 11 | Left Shoulder | 3 | f |
| 12 | Left Elbow | 1 | g |
| 13 | Left Wrist | 0 | h |
| 14 | Right Hip | 3 | i |
| 15 | Right Knee | 1 | j |
| 16 | Right Ankle | 0 | k |
| 17 | Left Hip | 3 | l |
| 18 | Left Knee | 1 | m |
| 19 | Left Ankle | 0 | n |

The joints of the skeletal mode of the present embodiment and 18 keypoints provided by OpenPose are not completely corresponded. For example, there are no keypoints provided by OpenPose which correspond to pelvis (base body), waist, chest, right clavicle, left clavicle, head of the skeletal model. Both the joints of the skeletal model of the present embodiment and 18 keypoints provided by OpenPose are typical feature points in the body and may not cover all possible feature points. Additional detail feature points may be provided. Alternatively, all of feature points of the body can be joints. Joint angles which cannot be determined with 18 keypoints provided by OpenPose can be determined by optimization considering a constraint such as a movable range. If the joints of the skeletal model and the feature points on which the spatial distribution of the likelihood is obtained correspond to each other from the beginning, such correspondence may not be necessary.

[C-3] Acquisition of Initial Pose of Skeletal Model and Distance Between Adjacent Joints.

An initial pose is obtained as a starting point for motion measurement of a subject. According to the embodiment, estimations of initial pose of skeletal model and distance between adjacent joints are obtained from the pixel positions of feature points that are calculated by applying OpenPose to a distortion-corrected image. First, an initial heatmap is obtained based on an initial image obtained by each camera n this embodiment, a light beam from each camera connecting an optical center of the camera and the pixel position of the center of gravity of the initial heatmap for each feature point calculated by OpenPose is considered, two cameras in which the length of the common perpendicular line between the beams of the two cameras is minimum are determined, a midpoint of two legs for the common perpendicular line is obtained as a 3D position of the feature point if the length of the common perpendicular line is less than or equal to a predetermined threshold (for example, 20 mm), and the distance between joints and the initial pose of the skeletal model are obtained by using the 3D positions of the feature points.

Various methods can be adopted by those skilled in the art for estimating the initial position of the feature point. For example, the initial position of a feature point in three-dimensional space can be estimated by the DLT (Direct Linear Transformation) method using the position of the corresponding point on each camera image and the camera parameters. Three-dimensional reconstruction using the DLT method is known to those skilled in the art, and detailed description thereof will be omitted.

An optimization calculation based on inverse kinematics requires a constant of the distance between adjacent feature points (a distance between joints), or a link length. However, since the link length differs for each subject, the link length of the skeletal model is calculated for each subject. It is desirable to perform scaling for each subject to improve the accuracy of motion capture of the embodiment. The skeletal model is a model of a standard human skeletal structure, and a skeletal model adapted for the subject body is generated by scaling the whole body or each section.

In this embodiment, each link length of the skeleton model is updated based on the obtained initial pose. With respect to the initial link length of the skeleton model, the scaling parameters used for updating the link length are calculated from the positions of the feature points based on the correspondence shown in FIGS. 10A and 10B and Table 1. As for the link lengths in FIG. 10A, the link lengths of 1-2, 2-3, 3-4, 3-6, 3-10, 6-7, and 10-11 do not have are the corresponding keypoints and the scale parameters cannot be determined by the similar way. Therefore, these link lengths are determined using scale parameters of the other links. In this embodiment, since the human skeleton basically has symmetrical lengths, each scaling parameter is obtained from the left and right averages so as to be even on the left and right, and the initial link length of the skeleton model is even on the left and right. Regarding the calculation of the scaling parameter between Neck and Head, the scaling parameter is calculated with the midpoint of the feature point position of both ears as the location of the head joint. Each link length of the skeleton model is updated using the obtained scaling parameters. Regarding the calculation of the positions of the nose, eyes, and ears, the positions of each virtual joint (nose, eyes, ears) are calculated based on the correspondence as shown in Table 2.

TABLE 2

Correspondence of Human Model to OpenPose

| 40DOF Human Model (FIG. 10 left) | | | OpenPose (FIG. 10 right) |
|---|---|---|---|
| Joint Number | Name | DOF | Reference |
| 5 | Head | 3 | — |
| 20 | Nose | 0 | a |
| 21 | Right Eye | 0 | o |
| 22 | Left Eye | 0 | p |
| 23 | Right Ear | 0 | q |
| 24 | Left Ear | 0 | r |

A link length may be obtained by another method or a link length obtained in advance may be used. Alternatively, if a skeletal model unique to the subject has been obtained, it may be used.

[D] Joint Position Obtaining Unit

The unit for obtaining joint positions is characterized in that the unit estimates position candidates for the joint position using the heatmap information obtained by the heatmap generating unit and updates the joint angles and joint positions of the skeletal model by performing optimization computation based on inverse kinematics using the candidates for the joint position. The unit for obtaining joint positions comprises a unit for obtaining candidates for joint positions estimating the candidates for the joint position based on the heatmap data, and an inverse kinematic calculation unit for calculating joint angles by performing an optimization calculation based on inverse kinematics using the joint position candidates, and a forward kinematics calculation unit calculating joint positions by performing the forward kinematics calculation using calculated joint angles.

According to the unit for obtaining joint position candidates of the present embodiment, joint positions and joint angles in the present frame (a frame at time t+1) are calculated by using joint position data of the previous frame (a frame at time t). A video motion capture for all T frames can be conducted by iterating the steps of obtaining joint angels and joint positions of the frame at time t+1 from joint positions of the frame at time t until t=T.

Because of a minute change of a joint position in one frame, joint position $^{t+1}J^n$ exists in the vicinity of joint position $^tJ^n$ where a joint position of joint n in a frame at time t is $^tJ^n$ and a joint position of joint n in a frame at time t+1 is $^{t+1}J^n$. Consider $(2k+1)^3$ pieces of lattice points (k is a positive integer) distributed around $^tJ^n$ with a spacing s and a set of points is expressed as:

$$^tJ^n := \left\{ {^tJ^n} + s \begin{bmatrix} a \\ b \\ c \end{bmatrix} \middle| -k \le a, b, c \le k \right\} \quad (1)$$

k: constant positive integers a, b, c: integers

Figure 11:
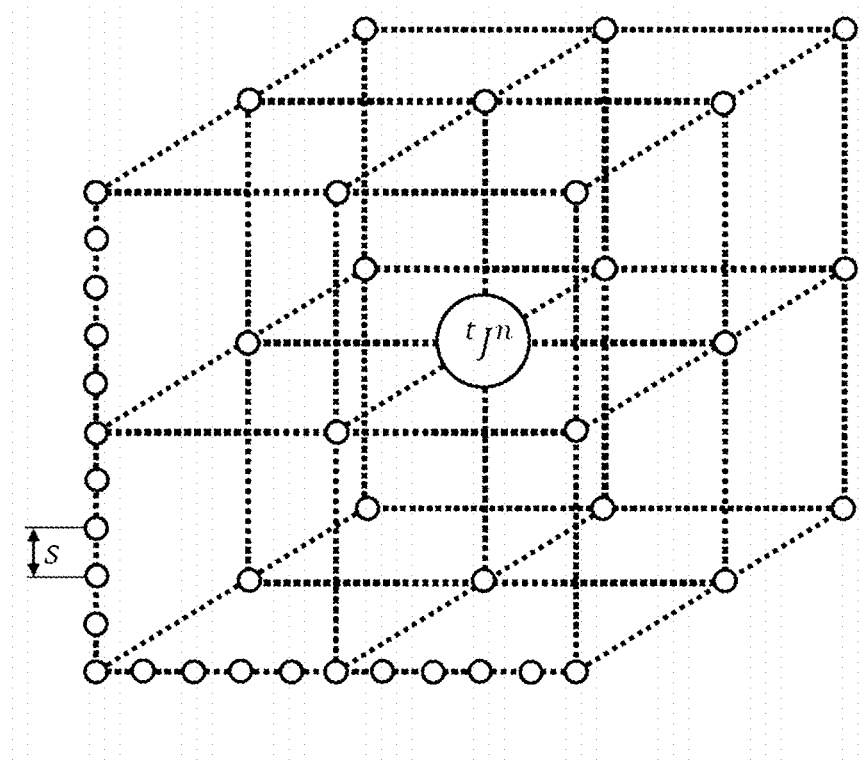
FIG. 11 is a diagram illustrating a set of points as a search range.

For example, as expressed in FIG. 11, consider 11×11×11 points (k=5) aligned in a grid-like manner around $^tJ^n$ with an interval of s. The distance s between lattice points is independent of the size of the image pixels.

A search range based on the joint position $^tJ^n$ in the frame at time t is, for example, a set of points in a space in the neighborhood of the joint position $^tJ^n$ and is determined by the total number of points $(2k+1)^3$ in the neighborhood space and an interval s between the points. In determining the search range, a cube is shown in FIG. 11, but the shape of the search range is not limited, and the search may be performed in a spherical range, for example. Alternatively, the search may be performed by using a rectangular parallelepiped or a prolate spheroid range obtained by narrowing a search range based on the displacement of the joint position in the past frames, or by setting a point different than $^tJ^n$ as the center point of the search range.

A search range (for example, a center point, a parameter k, and a search width s) can be appropriately set by those skilled in the art. The search range may be changed according to the type of motion of a subject. Further, the search range may be changed according to a velocity and acceleration of the motion of the subject (for example, the velocity of change of the pose of the subject). Further, the search range may be changed according to a frame rate of the camera for taking an image. Further, the search range may be changed for each joint section.

Note that all points in $^tJ^n$ can be converted to the pixel coordinates of the projection plane of an arbitrary camera using a function $P_i$. Supposed that a function $P_i$ denotes a function for converting one point $^tJ^n{}_{a, b, c}$ in $^tJ^n$ to a pixel position of the image plane of the camera i and a function $^{t+1}S^n{}_i$, denotes a function for obtaining PCM values in a frame at time t+1 from the pixel position, the maximum point of the sum of the PCM values calculated from $n_c$ pieces of cameras can be regarded as the most probable position of the joint n in the frame at time t+1, and $^{t+1}J^n_{pred}$, is obtained by $$^{t+1}J^n_{pred} = -\operatorname*{argmax}_{-k \leq a,b,c \leq k} \sum_{i=1}^{n_c} {}^{t+1}S_i^n(\mathcal{P}_i(^{t+1}J^n_{a,b,c})) \quad (2)$$

This calculation is executed for $n_j$ pieces of all joints (18 pieces in the case of Open Pose).

Note that each joint position $^{t+1}J^n$ of the frame at time t+1 is a function of the joint angle $^{t+1}Q$, as expressed in the equation (3), the joint angle $^{t+1}Q$ is obtained by an optimization calculation based on the inverse kinematics, and the joint position $^{t+1}J^n$ is obtained by a forward kinematics calculation.

$$^{t+1}Q = \operatorname*{argmin} \sum_{n=1}^{n_j} \frac{1}{2} {}^{t+1}W^n \|^{t+1}J^n_{pred} - {}^{t+1}J^n(^{t+1}Q)\|^2 \quad (3)$$

Here, the sum of the PCM values in the prediction position of each joint is used for the weight of each joint in the optimization calculation based on the inverse kinematics $^{t+1}W^n$ as defined as:

$$^{t+1}W^n = \sum_{i=1}^{n_c} {}^{t+1}S_i^n(\mathcal{P}_i(^{t+1}J^n_{pred})) \quad (4)$$

Each joint position obtained in realtime or non-realtime by the joint position obtaining unit is stored in the storage unit as time series data of the joint positions. In the embodiment, each joint position obtained by the joint position obtaining unit in realtime or non-realtime is smoothed by the smoothing processing unit to generate a smoothed joint position.

As for the optimization calculation based on the inverse kinematics, the algorithm described in Non-Patent Document 17 can be used for example. Several methods are known to those skilled in the art as optimization calculation methods based on the inverse kinematics, and specific optimization calculation methods are not limited. As one preferable example, the numerical solution by the gradient method can be illustrated. Further, the equation (4) that defines the weight of each joint in the optimization calculation based on the inverse kinematics is a preferable embodiment and is illustrative. For example, according to an embodiment, in the smoothing processing unit, the weights of all joints are made uniform with respect to the weights of the joint positions after smoothing, and the optimization calculation based on the inverse kinematics is performed. In addition, it is understood that those skilled in the art may appropriately give constraints on optimization calculations based on the inverse kinematics.

In the above search method, since the search range depends on the lattice spacing s, if a point having the highest PCM score exists between lattice points, such point cannot be found. In the present embodiment, inverse kinematics-based optimization calculations may be performed not only by searching for the maximum value according to the equation (2), but by searching for a plurality of points from all the lattice points as a group of joint position points defining a location where the PCM score is high. The group of joint position points consists of, for example, 7 points. The numerical value of 7 is a value determined from the expectation that there are similar high likelihood points in front and behind, above and below, and left and right around the maximum point obtained by the equation (2).

Figure 6:
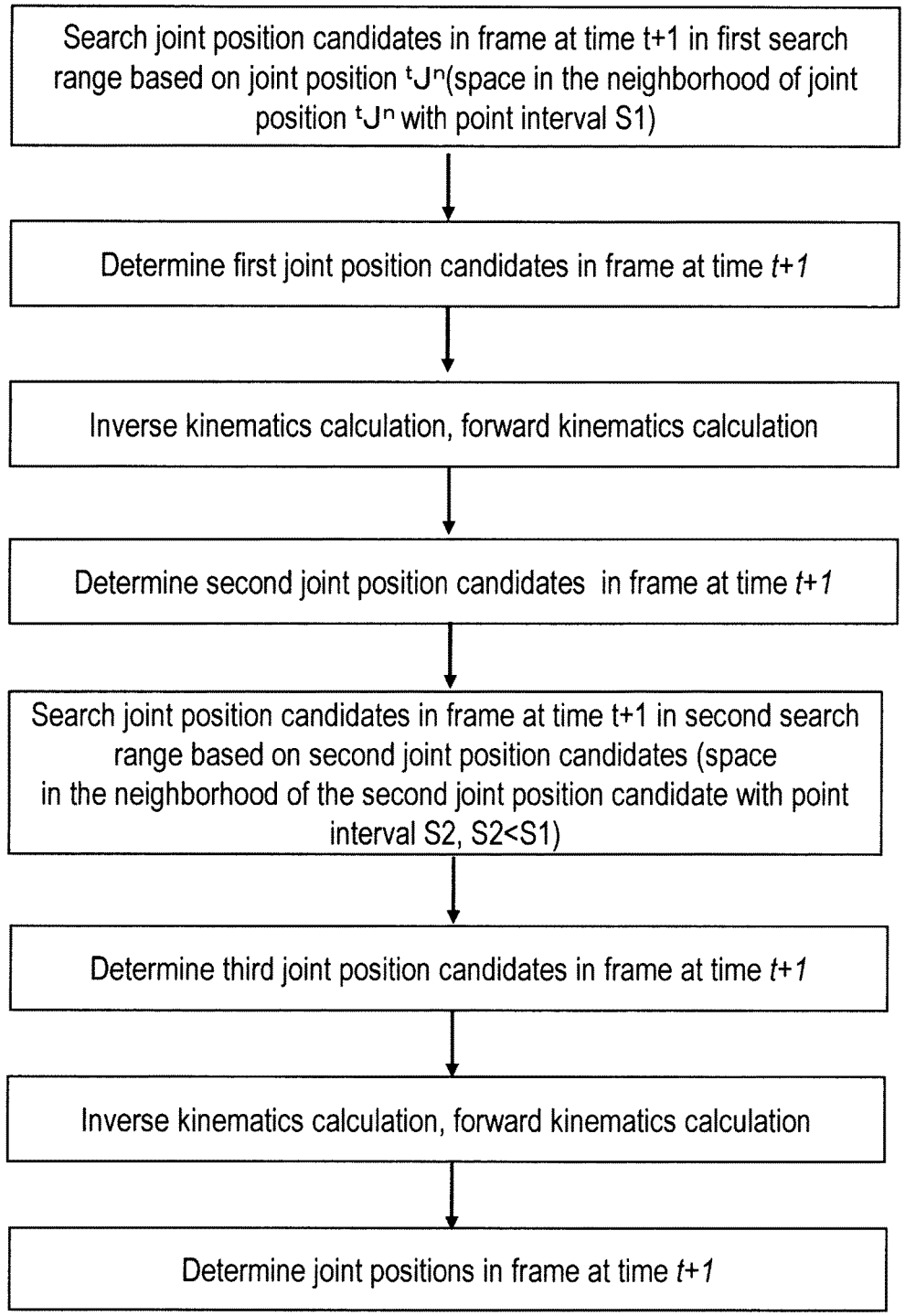
FIG. 6 is a flowchart showing processing steps performed by a unit for obtaining joint position candidates (where different lattice spacings are used).

Joint positions may be obtained using different lattice spacings s. In one embodiment, the search for joint position candidates and the optimization calculation based on the inverse kinematics are executed twice by changing the value of s from 20 mm to 4 mm, and video motion capture of all T frames is performed by repeating the steps of acquiring joint angles and positions in a frame at time t+1 from the joint positions in a frame at time t until t=T. This makes it possible to achieve both search speed and search accuracy. FIG. 6 shows steps for obtaining a joint position using different lattice spacings.

First, a joint position candidate in a frame at time t+1 is searched in a first search range (points in a space in the neighborhood of a joint position $^tJ^n$ with a spacing s1) based on the joint position $^tJ^n$ in a frame at time t. The interval s1 is, for example, 20 mm. In this step, first candidates for the joint position in the frame at time t+1 are obtained. Second candidates for the joint position in the frame at time t+1 are obtained by executing the optimization calculation based on the inverse kinematics using the first candidates for the joint position and the forward kinematics calculation.

Next, the search for the joint position candidate in the frame at time t+1 in a second search range (points in a space in the neighborhood of the second joint position candidates with a spacing s2, s2<s1) based on the second joint position candidates in the frame t+1 is performed. The interval 52 is, for example, 4 mm. In this step, third candidates for the joint position in the frame t+1 are obtained. Using the third candidates for joint position, the optimization calculation based on the inverse kinematics and the forward kinematics calculation are executed to obtain the joint angle and joint position in the frame at time t+1.

In the present embodiment, the search range is determined based on the joint position obtained in the immediately preceding frame at time t, but in addition to or instead of the joint position obtained in the immediately preceding frame at time t, joint positions obtained in one or a plurality of frames prior to the frame at time t, or joint positions obtained in one or a plurality of frames following the frame at time t+1 may be used. For example, when the joint position is obtained in realtime, the search range may be set based on the joint position in a frame occurred two or more frames before the frame at time t+1 such as a frame at time t−1 or a frame at time t−2. Further, the feature point position search may be performed separately for an even frame and an odd frame by parallel calculation, and the smoothing process may be executed for the feature point position candidates that are alternately outputted.

In the calculation of equation (2), the likelihood for evaluating is an index of the high accuracy of motion capture. A threshold value may be set for this likelihood, and if the likelihood is lower than the threshold value, it may be considered that the tracking of the subject pose has failed, and the search range for the joint position candidate may be expanded to perform the search. This may be applied for some parts of the whole body pose, or for the whole body. In addition, if a feature point is temporarily lost due to an occlusion, etc., an offline analysis forwards time to determine the heatmap for the same subject, and then restores a portion of the trajectory of the joint position where tracking has failed due to the occlusion by tracing back in time by using continuity of the motion. This may minimize the loss due to the occlusion.

As described above, in the present embodiment, as a method of searching for a point in the 3D space having the maximum PCM score, a set of points in the 3D space is projected onto a 2D plane, and the PCM values of the pixel coordinates are acquired. Then, the sum (PCM score) of the PCM values is obtained, and the point with the highest PCM score in the set of points is set as a joint position candidate as a point in the 3D space where the PCM score is maximum. The calculation for projecting a 3D point to each camera plane and calculating the PCM score is light. According to the search for joint position candidates of the present embodiment, a reduction in calculation amount and an exclusion of outliers are realized by limiting the search range using the information of the previous frame and reprojecting the three-dimensional positions of the lattice points in the search range onto a two-dimensional image (PCM).

Figure 7:
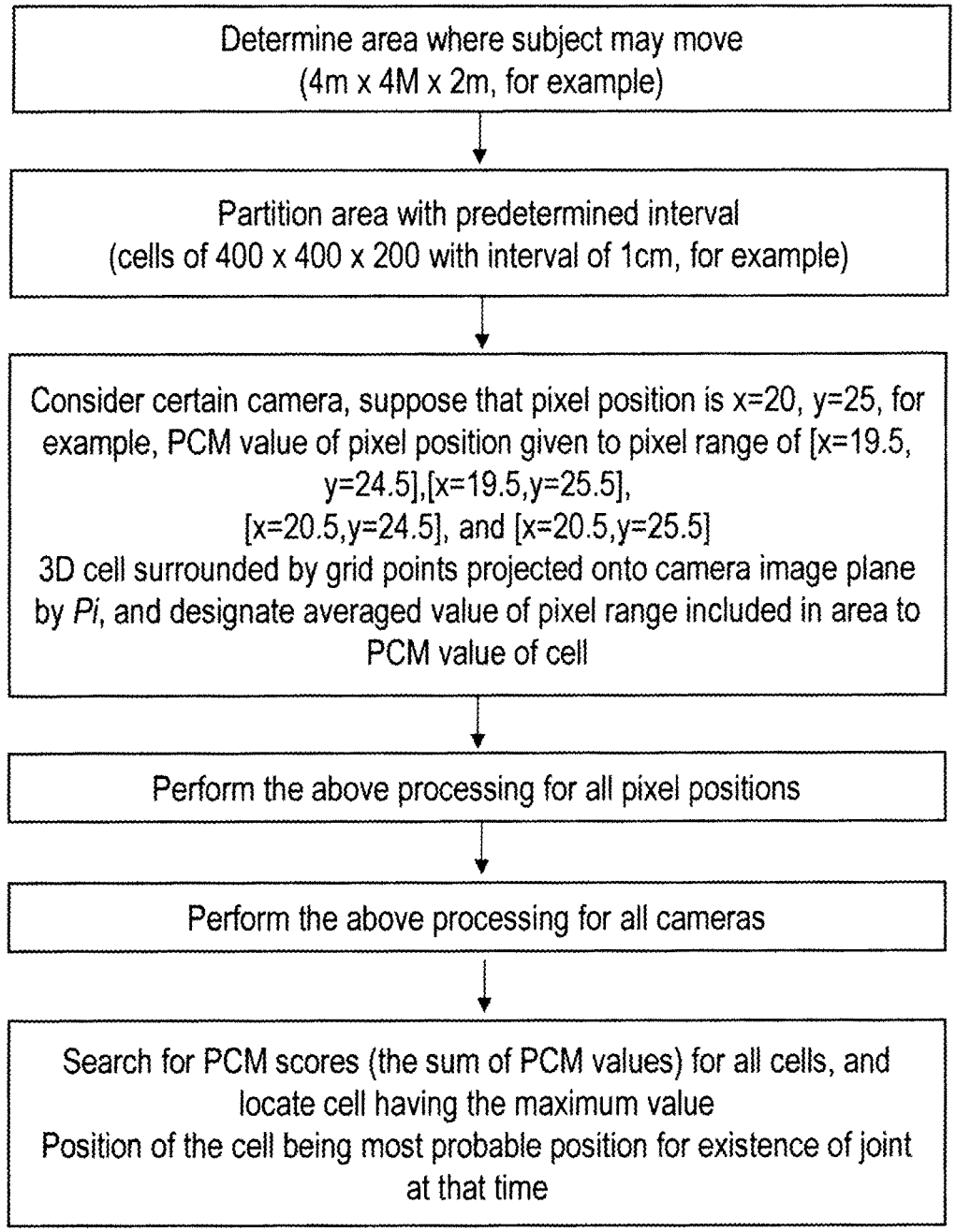
FIG. 7 is a flowchart showing other processing steps performed by a unit for obtaining a joint position candidate.

Referring to FIG. 7, another aspect of the joint position candidate obtaining unit will be described. First, an area where a subject can move (for example, 4 m×4 m×2 m) is set. The area is divided into cells (for example, 400×400×200 cells are generated every 1 cm) at a predetermined interval.

Considering a pinhole camera model, for a certain camera, supposing that a pixel position is x=20 and y=25, for example, a PCM value of the pixel position is given to a pixel range of [x=19.5, y=24.5], [x=19.5, y=25.5], [x=20.5, y=24.5] and [x=20.5, y=25.5]. A 3D cell defined by the lattice points is projected on a camera image plane by $P_i$ in which a PCM value of the cell is an averaged value of the PCM values of all the pixel ranges included in the area. The above process is executed for all cameras.

The PCM scores (the sum of PCM values) of all cells are searched for and a cell having the maximum value is located. The position of the cell is the position at that time with a high likelihood that a joint exists. This technique may be used to estimate the initial position of the joint.

Further, the joint position candidate obtaining unit may estimate the joint position candidate by 3D reconstructing it using the coordinates of the center of gravity and the coordinates of the maximum value of the PCM value detected from a plurality of 2D heatmaps. For this 3D reconstruction, for example, the DLT method can be used. The optimization calculations based on inverse kinematics and the forward kinematics calculations may be applied to the estimated joint position candidates. The joint position candidate obtaining unit may include a plurality of joint position candidate obtaining methods that are executed in parallel.

[E] Smoothing Processing Unit

Acquisition of PCM and the optimization calculation based on the inverse kinematics performed in the unit for obtaining joint positions do not consider time series relationships so that it is not guaranteed that outputted joint positions are smooth in a temporal direction. The smoothing processing unit comprises a unit for obtaining smoothed joint positions which considers temporal continuity and performs a smoothing processing using time series information of joints. For example, when smoothing the joint positions obtained in a frame at time t+1, the joint positions obtained in the frame at time t+1, the joint positions obtained in a frame at time t and the joint positions obtained in a frame at time t−1 are typically used. Regarding the joint positions obtained in the frame at time t and the joint positions obtained in the frame at time t−1, the joint positions prior to the smoothing processing for the joint position in the frame at time t+1 are used but the joint positions after the smoothing processing for the joint position in the frame at time t+1 may be used. When performing the smoothing processing in non-realtime, the joint positions obtained at succeeding frames, the joint positions of one or more frames following the frame at time t+1 for example, can be used. The unit for obtaining smoothed joint positions does not necessarily use adjacent sequential frames. To simplify the calculation, the smoothing processing is performed without using body structural information, so the link length, which is a distance between adjacent joints are not maintained. Then the smoothing processing while maintaining the link length is performed by the optimization calculation based on the inverse kinematics using the skeletal structure of the subject and smoothed joint positions to obtain each joint angles of the subject.

The unit for obtaining smoothed joint positions performs a temporal smoothing processing for the joint positions by a low pass filter. The smoothing processing with a low pass filter is applied to the joint positions obtained by the unit for obtaining the joint positions, and the optimization calculation is performed based on inverse kinematics by setting a smoothed joint position as a target position of each joint. A smoothness of the temporal change of joint position can be effective in the skeletal condition where a distance between joints is a constant.

The smoothing processing unit will be described more specifically. In the present embodiment, an IIR low pass filter shown in Table 3 is designed, and the joint position is smoothed by the low pass filter. A value of the cutoff frequency is a value that can be appropriately set by those skilled in the art, and for example, empirically, the values shown in Table 3 can be used. Parameters of the smoothing filter may be adjusted according to the type of motion to be measured and a frame rate of the camera for taking an image of the motion.

TABLE 3

| IIR Low Pass Filter Design | |
|---|---|
| Filter Order | 6 |
| Cutoff Frequency | 6 Hz |
| Sample Rate | 60 Hz |

There is a problem in which due to the characteristics of the low pass filter, the acquisition of the joint position through the low pass filter causes a delay of 3 frames, which is half the filter order, and the low pass filter cannot be applied for 3 frames from the start of joint angle updating. In the present embodiment, by assigning the joint positions of the first frame to a $-2^{nd}$ frame, a $-1^{st}$ frame and a $0^{th}$ frame prior to the application of the filter, the smoothing process for all joint positions with little spatial errors can be performed though the calculation time is delayed by two frames.

If each joint position obtained by the above filter is used as an output of video motion capture, the temporal smoothness of each joint can be obtained, but the condition that the distance between adjacent joints is constant may be broken. In this embodiment, the joint position after the application of this low pass filter is set as the target joint position for each joint, and the optimization calculation based on inverse kinematics is performed again. Equation (3) can be used for the optimization calculation based on inverse kinematics, but the optimization calculation based on inverse kinematics is performed assuming that the weights of all joints are uniform (but not limited to this). By so doing, the smoothness of the temporal change of the joint position adapted to the low pass filter can become effective the skeletal condition that each distance between joints is invariant.

An output of the smoothing processing unit includes, for example, joint angle information and skeletal structure, and joint position information that can be uniquely calculated from the two pieces of information. For example, when drawing CG, the movement of the body is drawn by the forward kinematics calculation using the joint angle information and a file of the skeletal structure of the body. The information included in the output of the smoothing processing unit may be stored in the storage unit.

[F] Preprocessing Unit

The motion capture system of the present embodiment may comprise a preprocessing unit for performing preprocessing based on information obtained at a previous frame (in one aspect, the previous frame is an immediate previous frame but not limited to the immediate previous frame) prior to heatmap calculation. In one aspect, the preprocessing is performed by a computer which calculates the heatmap from the input image but may be performed by another computer.

[F-1] Rotation of Input Image

Regarding heatmap calculation, the accuracy may be lowered for an image in which a person is in a lying position or a posture close to an inverted position in compared to an image in which a person is in an upright posture. This is because the training data used in the heatmap generating unit comprises image data mostly including a nearly upright posture so that the estimation error of the lower body may become large in an inverting motion such as the handstand or cartwheel of a subject. In this case, an image is rotated according to the inclination of the subject body in the previous frame so that the subject appears in the image in a posture as close to upright as possible. In this embodiment, the PCM of the lower body is acquired from the rotated image.

By generalization, when it is known that the accuracy of the heatmap information deteriorates significantly when the posture of a subject belongs to a predetermined first pose set (for example, lying down or inverted), and the accuracy of the heatmap information is high when the posture of a subject belongs to a predetermined second pose set (for example, upright), determining whether the pose of the subject in an input image belongs to the first pose set from the inclination of the subject body in the input image, and rotating the input image so that the pose of the subject in the input image becomes one of the second pose set (upright) to obtain heatmap information. Especially when the heatmap information is acquired in realtime, the determination of the inclination of the subject is executed based on the input image in the previous frame. An idea of rotating an input image to acquire the heatmap information is a technique that can be generally applied to the heatmap generating unit independently of the motion capture according to the present embodiment, Due to the accumulation of training data and the improvement of the convolutional neural network (CNN), it may not be necessary to rotate the input image. Further, when a movable camera is used, it may not be necessary to rotate the input image by physically rotating the camera itself according to the motion of the subject by obtaining the function $P_i$ for each frame.

Figure 8:
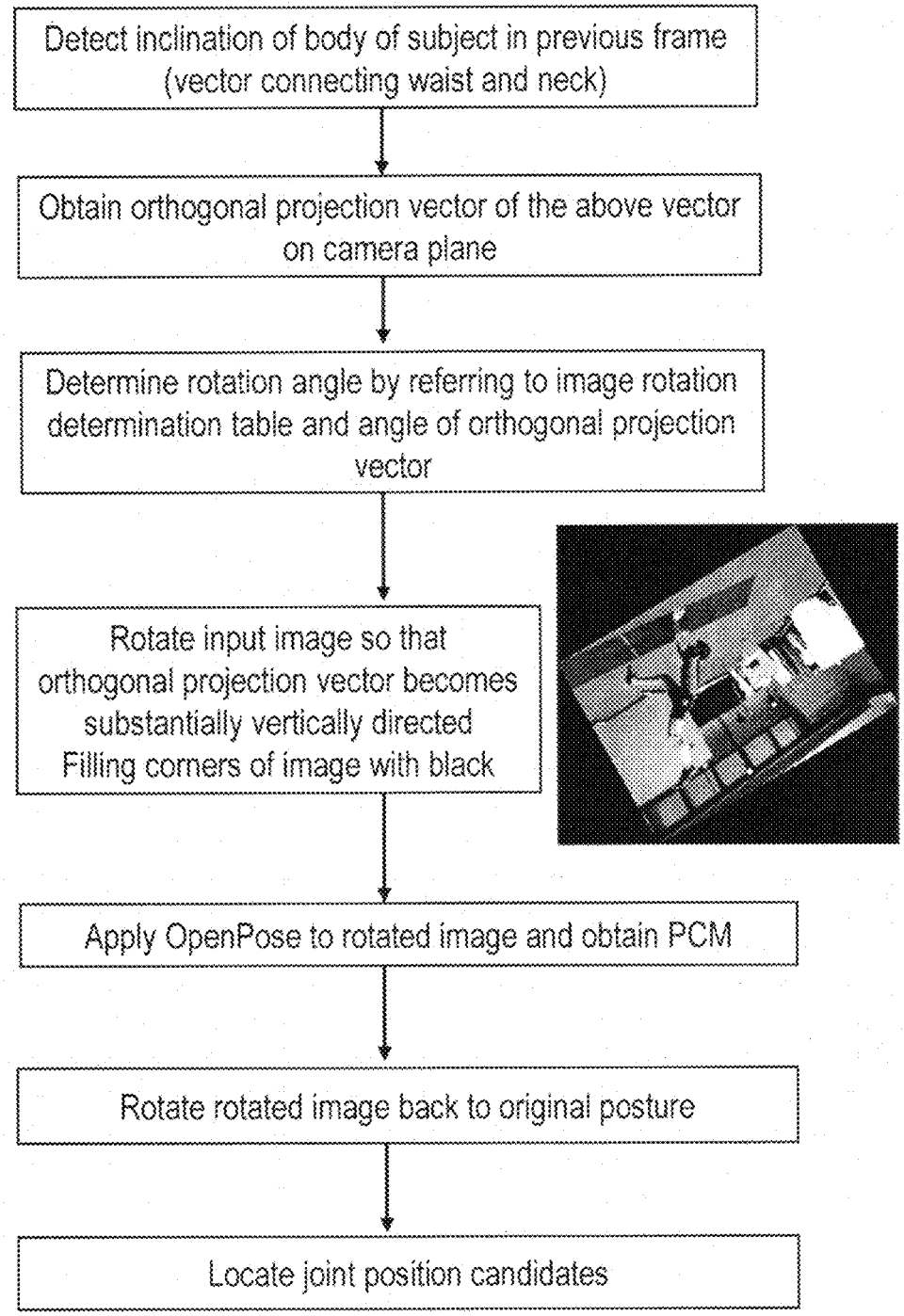
FIG. 8 is a flowchart showing steps for rotating an input image to acquire PCM.

Referring to FIG. 8, the steps of rotating an input image to acquire PCM will be described. In the input image of a frame at time t, the inclination of the body of the subject (in one aspect, the inclination of the trunk) is detected. For example, a vector connecting the waist and neck of the subject is calculated, Specifically, the three-dimensional coordinate positions of the pelvis joint and the neck joint of the skeleton model shown in FIG. 10A are calculated. Using the function $P_i$ that transforms a point on three dimensions into the pixel position of the image plane of camera i, the inclination of the subject body at camera i at frame t (an angle of the vector connecting the waist and neck projected in each camera direction) is obtained.

The necessity of image rotation processing is determined based on the inclination of the subject body. In the present embodiment, the image of frame t+1 is rotated so that an orthogonal projection vector points vertically upward according to the obtained inclination of the body (angle of the orthogonal projection vector). For example, a set of a plurality of rotation angles (for example, 0 degree, 30 degrees, 60 degrees, 90 degrees, 330 degrees in 30-degree increments) and an angle range corresponding to each rotation angle (for example, an angle between 15 degrees and 45 degrees corresponds to 30 degrees) are set and stored in the storage unit as a table for determining the rotation of the input image, With reference to this table, it is determined which angle range the inclination of the subject body (angle of the orthogonal projection vector) in the previous frame corresponds to, and the input image is rotated by the angle corresponding to the determined angle range, and then PCM is obtained. When acquiring the heatmap offline, the PCM may be obtained for each rotation angle and stored in the storage unit, and the PCM may be selected according to the angle of the orthogonal projection vector. In the rotated image, the background (four corners) may be filled with black to facilitate input to the OpenPose network. OpenPose is applied to the rotated image to calculate the PCM of the lower body of the subject. The rotated image with PCM is returned to the original image orientation. Then, the joint position candidates are searched. The previous frame used for determining the rotation of the input image may be not only a frame at time t but also a frame at time t−1 or preceding frames.

[F-2] Other Preprocessing

The preprocessing is not limited to the process of rotating the input image according to the inclination of the subject body. Trimming or/and reduction, masking, camera selection, and stitching can be exemplified as the preprocessing performed by using three-dimensional position information of one or a plurality of subjects in the previous frames.

The trimming is to trim an image with reference to the position on the image in the previous frame, so as to perform the PCM calculation only for a trimmed portion. Reducing the PCM calculation time by trimming is advantageous in realtime acquisition of the subject motion. Similarly, if the input image is sufficiently large, an accuracy for PCM generation by OpenPose may not change by reducing the image, but the PCM calculation time may be shortened by trimming the image.

The masking as the preprocessing is a process of applying the masking to the non-target person or the like so as to perform PCM calculation of the subject when the input image includes a person or the like other than the subject. By masking, it is possible to prevent mixing up of PCMs for multiple subjects. The masking may also be executed in the joint position obtaining unit after the PCM calculation.

The camera selection is to select an input image to be used for motion capture or motion analysis of a subject by selecting a camera when the video obtaining portion includes a plurality of cameras. For example, when performing motion capture using a large number of cameras in a wide field, cameras which are expected to capture a subject are selected by pre-processing, and motion capture is performed using input images of the selected cameras, instead of performing motion capture and motion analysis using information from all the cameras. Further, as a preprocessing, stitching of the input image may be performed. Stitching refers to stitching each camera image using acquired camera parameters when there is an overlapping area at each angle of view, and synthesizing them into one seamless image. As a result, the PCM can be estimated properly even when the subject partially appears at an end portion of the input image.

[G] Motion Analysis Using Motion Capture

Figure 9:
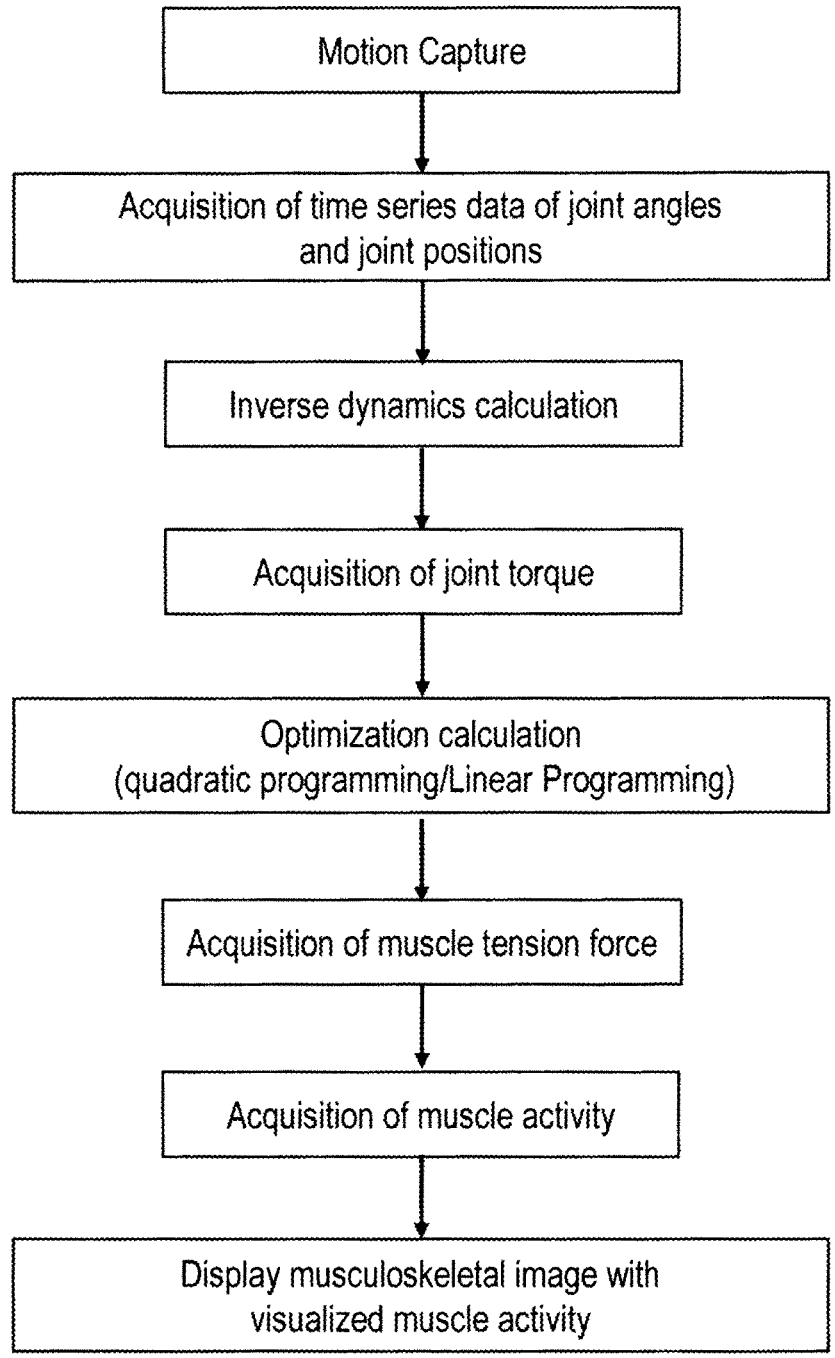
FIG. 9 is a flowchart showing steps for motion analysis using motion capture.

FIG. 9 illustrates an operational process of motion analysis using motion capture. A motion of a subject is obtained by the motion capture according to the present embodiment. Time series data of obtained joint angles and joint positions is obtained. Further, based on the time series data, the joint torque is acquired by inverse dynamics calculation, and a wire tension in the musculoskeletal model equipped with the wires that imitate the muscles is obtained by performing an optimization calculation (a quadratic programming method or linear programming) using the joint torque. A muscle activity is calculated by using the wire tension, a musculoskeletal image with a color assigned according to the level of muscle activity is generated, a musculoskeletal image with visualized muscle activity is outputted to a display at a predetermined frame rate to display as a motion video. The details will be described below.

By interpolating a temporal displacement between frames for of all DOFs of the skeleton acquired by motion capture with a continuous function, the displacement of all DOF of the skeleton at each frame time, a velocity as a time derivative of the displacement, and acceleration as a time derivative of velocity are calculated. A position, angle, velocity, angular velocity, acceleration, and angular acceleration of each link calculated from them are sent to an inverse dynamics engine, and joint torques that match the motion are calculated by calculating mechanic information according to a motion of a skeleton with assumed masses. Each segment of the skeleton is a rigid body, and its mass, center of gravity position, and inertia tensor can be estimated from statistical measurement information of each part of a person using physique information. Alternatively, these parameters can be estimated by identification from the motion information of a subject. The physique information of the subject used for the estimation may be acquired in advance.

Tensions of the wires distributed throughout the body, which model the muscles, are calculated using the biased and weighted quadratic programming. Non-Patent Document 16 can be referred to for the calculation of the wire tension. Measurement values of the force distribution when the antagonist muscles are used according to classified motions are obtained, and biases and weights with reference to the measurement values are used to obtain a solution that better approximates the actual muscle tension. An electromyogram or a floor reaction force meter may be used in obtaining the muscle tensions.

A value obtained by dividing the acquired muscle tension by the assumed maximum muscle tension is used as a muscle activity, and an image of the whole body musculoskeletal system in which the muscle color is changed according to the muscle activity is generated, and is outputted as a certain frame rate (typically 30 FPS) to the display to display as a video. An image of skeletal pose is also generated and outputted to the display at a certain frame rate to display as a video. Further, changes in the values of each variable (for example, a joint angle, a velocity, a muscle tension, a floor reaction force, a center of gravity, etc.) are graphed and outputted. These outputs may be presented as analysis results by images and graphs and are used as records of muscle and body activities or motions of each part of the body during exercise. In this way, steps of taking images of a motion of a subject, obtaining three-dimensional pose of the subject during the motion, and estimating and visualizing the muscle activity required for the motion can automatically and efficiently be performed.

[H] Flow from Input Image to Obtaining of Position of Feature Points of Subject

Referring to FIG. 3, steps for obtaining the joint angles and the positions of the feature points from input images in accordance with the embodiment will be described. A motion of a subject is photographed by a plurality of synchronized cameras, and an RGB image is outputted from each camera at a predetermined frame rate. Upon receiving the input image, the processing unit determines whether a preprocessing is required. The preprocessing is, for example, the rotation of the image. When it is determined that an input image needs to be rotated according to a predetermined determination criterion, a heatmap is generated based on an image rotated from an input image. If it is determined that the rotation of the image is not required, a heatmap is generated based on the input image.

As for all feature points in the body, a spatial distribution (heatmap) of the likelihood of the position of the feature points in the body is generated and transmitted to the processing unit. At the processing unit, the search for position candidates for the feature point is performed. In one aspect, when the heatmap generated from the input image in a frame at time t+1 is received, the search range is set based on the position of the feature point in a frame at time t, and the search for the position candidates for the feature point is performed. Then, the same process is executed for all joints, and joint position candidates for all joints are obtained.

The optimization calculation based on the inverse kinematics is performed for position candidates for all the feature points. The position candidates for the feature points and the joints (feature points) of the skeleton model are corresponded with each other, and the skeleton model is adapted to a skeleton model unique to a subject. Based on the candidates and weights for the positions of the feature points, the optimization calculation based on the inverse kinematics and the forward kinematics calculation are executed to obtain the joint angles and the positions of the feature points.

A smoothing processing is applied to the obtained position of feature point by using joint positions in the past frames to smooth the temporal movement of the joint position. The optimization calculation based on the inverse kinematics by using the positions of the smoothed feature points is again performed to obtain the joint angles of the subject, and joint positions are obtained by performing the forward kinematics calculation by using the obtained joint angles.

According to the present embodiment, the point where the PCM score is maximized is assumed to correspond to the most suitable pose in the current frame, and joint position candidates are acquired. On the other hand, the optimization calculation based on the inverse kinematics and smoothing processing using a low pass filter are performed in the following processes while allowing the PCM score to decrease. It is possible to reduce an estimation error of the position of the feature point by executing the optimization calculation based on the inverse kinematics while considering the skeletal structure of the subject and the temporal continuity of the position of the feature point.

Adopting the algorithms represented by the equations (1) to (4) in the joint position candidate obtaining unit in the present embodiment has the following advantages. The ambiguous joint position, which has a spatial distribution as a heatmap, can be optimized by referring to the human skeleton shape (by performing the optimization calculation based on the inverse kinematics). In the search for joint position candidates, multiple heatmap information with a spatial distribution which is obtained from the input image from each camera is used as it is, followed by obtaining joint positions by the optimization calculation based on the inverse kinematics by using the joint position candidates considering the skeletal structure of a subject. By utilizing heatmap information from multiple directions, which has abundant information on the spatial distribution of likelihoods, it is possible to deal with a motion in which an estimation of a joint position with only a single image would be erroneous. For example, even when a desired heatmap cannot be generated from an input image from a camera, the heatmap generated from an input image from another camera can be used, so that the correction is possible. Even when a certain feature point is likely to be three-dimensionally reconstructed at an erroneous position, the correction is possible because the constraint condition that a distance between the position of the feature point and the position information of the other feature point does not change can be used. Even when a joint position is likely to be erroneously estimated in a frame, the correction is possible because a condition in which a joint position at the frame and the joint position information at the previous frame are smooth in time are used.

In the skeletal structure, if it is necessary to determine the displacement of the DOFs of the skeleton that cannot be determined only by the position of the feature point obtained from the heatmap information, it may be determined by optimization using conditions with prior knowledge. For example, an initial angle is given using the prior knowledge that the hands and toes are positioned at forefronts of the wrists and ankles, respectively. If information of the hand or toe is obtained, the initial angle is changed for each frame, and if information of the hand or toe is not obtained, the angle of the hand or toe may be fixed without changing from an angle of the previous frame. Further, the optimization calculation based on the inverse kinematics may be performed by using prior knowledge such as giving weights and restrictions to each degree of freedom of the wrists and ankles according to the range of motion of the elbows and knees to prevent inversion of the wrists and ankles and giving a restriction in which the body does not penetrate the ground.

The motion capture according to the present embodiment performs three-dimensional reconstruction from joint positions estimated by using deep learning from images of a plurality of cameras in consideration of the structure of the human skeleton and the continuity of motion and enables smooth motion measurements comparable to the conventional optical motion capture. The above motion capture can solve various problems as described below.

In order to widely utilize motion analysis not only for top athletes and dancers with special skills, but also for general exercise enthusiasts, student sports, rehabilitation patients and the elderly to monitor their physical functions, the challenge was to reduce the cost of motion capture by simplifying the equipment and reducing the labor and time involved in preparation and post-capture processing. In this regard, the motion capture according to the present embodiment makes it possible to perform motion capture from a plurality of camera images indoors, outdoors, and without markers regardless of clothes, and a special device other than a video camera is not required.

Another issue was to make it possible to perform calculations from data acquisition to three-dimensional reconstruction of motion and motion analysis in realtime as much as possible. By solving this issue, if a system that does not depend on the length of exercise time to be measured (for example, even if it is a long time such as a soccer match time, the analysis is completed at the end of the exercise) can be constructed, anyone will be able to use motion analysis without the intervention of a motion capture engineer or a specialized trainer. In this regard, the motion capture according to the present embodiment enables realtime motion analysis from only a video image without markers regardless of whether it is indoors, outdoors, or wearing clothes. This makes it possible to measure the motion of a large number of people, which was not possible with the conventional motion capture with a marker attached, which took time and effort, and it is also possible to promote the conversion of motion data into big data. Further, the motion capture according to the present embodiment can be implemented as a service for returning the motion analysis result in response to upload of the video image. In addition, using this video motion capture technology, it is also possible to newly create training data (a file in which an input image and feature point positions are described) necessary for creating a heatmap generating unit.

This motion capture system can be applicable in various fields including sports (motion analysis, coaching, tactical suggestions, automatic scoring of competitions, detailed training logs), smart life (general healthy life, watching over the elderly, discovering suspicious behavior), entertainment (live performance, CG creation, virtual reality games and augmented reality games), nursing, medical, etc.

The invention claimed is:

1. A method of obtaining joint positions of a subject with an articulated structure, said subject having a plurality of feature points in the body of said subject including a plurality of joints wherein a distance between adjacent feature points is obtained as a constant,
   obtaining a spatial distribution of a likelihood of a position of each feature point based on a single input image or a plurality of input images taken at the same time;
   obtaining one or a plurality of position candidates corresponding to each feature point based on the spatial distribution of said likelihood of the position of each feature point;
   obtaining each joint angle by performing an optimization calculation based on inverse kinematics using said candidates and said articulated structure; and
   obtaining positions of the feature points including the joints by performing a forward kinematics calculation using said joint angles.

2. The method according to claim 1, wherein said obtaining position candidates for each feature point comprises obtaining one or a plurality of position candidates for each feature point by setting a a search range which is determined based on one or more positions of each feature point obtained in one or more previous frames.

3. The method according to claim 2, wherein said search range is determined using at least a position of each feature point obtained in an immediate previous frame.

4. The method according to claim 2, wherein said search range is a set of a predetermined number of points three-dimensionally distributed at a predetermined interval around a position which is determined based on one or more positions of each feature point obtained in one or more previous frames.

5. The method according to claim 1, wherein the spatial distribution of the likelihood is used in the optimization calculation based on the inverse kinematics.

6. The method according to claim 1 further comprising:
smoothing the positions of feature points in a temporal direction using a plurality of positions of the feature points obtained at a plurality of the other frames; and
obtaining each joint angle of the subject by performing the optimization calculation based on the inverse kinematics using said smoothed positions of feature points and the articulated structure of the subject.

7. The method according to claim 6, wherein the positions of the feature points including the joints are obtained by performing the forward kinematics calculation using said joint angles.

8. The method according to claim 1, said method further comprising a preprocessing step based on information obtained at a frame prior to the input image,
said preprocessing step comprising at least one of:
(a) rotation of the input image;
(b) trimming and/or reducing of the input image;
(c) masking of the input image;
(d) selection of the input image by selecting a camera; and
(e) stitching of the input image.

9. The method according to claim 8, wherein said preprocessing step comprises the rotation of the input image, and the preprocessing step comprising:
obtaining an inclination to an upright pose of the body of the subject at the frame prior to the input image;
rotating the input image in accordance with the inclination to obtain an upright pose or a nearly upright pose;
obtaining the spatial distribution of the likelihood based on the rotated image; and
rotating the rotated image with the spatial distribution of the likelihood back to the original input image.

10. The method according to claim 1, wherein time series data of joint angles and joint positions is obtained by obtaining the joint angles and joint positions in each frame to capture the motion of the subject.

11. A system for obtaining joint positions of a subject comprising a memory and a processor,
said memory configured to store a file defining an articulated structure comprising a plurality of feature point in the body of the subject including a plurality of joints and a set of constants each defining a distance between adjacent feature points,
said processor configured to:
obtain a spatial distribution of a likelihood of a position of each feature point based on a single input image or a plurality of input images taken at the same time;
obtain one or a plurality of position candidates corresponding to each feature point based on the spatial distribution of said likelihood of the position of each feature point;
obtain each joint angle by performing an optimization calculation based on inverse kinematics using said candidates and said articulated structure; and
obtain positions of the feature points including the joints by performing a forward kinematics calculation using said joint angles.

12. The system according to claim 11, wherein said memory is configured to store time series data of the obtained positions of the joints; and said processor is configured to obtain one or a plurality of position candidates for each feature point by setting a search range which is determined based on one or more positions of each feature point obtained in one or more previous frames.

13. The system according to claim 12, wherein said processer is configured to determine the search range by using at least a position of each feature point obtained in an immediate previous frame.

14. The system according to claim 12, wherein the search range is a set of a predetermined number of points three-dimensionally distributed at a predetermined interval around a position which is determined based on one or more positions of each feature point obtained in one or more previous frames.

15. The system according to claim 11, wherein the spatial distribution of the likelihood is used in the optimization calculation based on the inverse kinematics.

16. The system according to claim 11, wherein said processor is configured to:
smooth the positions of feature points in a temporal direction using a plurality of positions of the feature points obtained at a plurality of the other frames; and
obtain each joint angle of the subject by performing the optimization calculation based on the inverse kinematics using said smoothed positions of the feature points and the articulated structure of the subject.

17. The system according to claim 16 wherein the position of the feature points including the joints is obtained by performing the forward kinematics calculation using said joint angles.

18. The system according to claim 11, said processor is configured to perform a preprocessing based on information obtained at a frame prior to the input image, and
said preprocessing comprise at least one of:
(a) rotation of the input image;
(b) trimming and/or reducing of the input image;
(c) masking of the input image;
(d) selection of the input image by selecting a camera; and
(e) stitching of the input image.

19. The system according to claim 18, wherein said preprocessing comprises the rotation of the input image, and the processor is configured to:
obtain an inclination to an upright pose of the body of the subject at the frame prior to the input image;
rotate the input image in accordance with the inclination to obtain an upright pose or a nearly upright pose;
obtain the spatial distribution of the likelihood based on the rotated image; and
rotate the rotated image with the spatial distribution of the likelihood back to the original input image.

20. The system according to claim 11 further comprising one or a plurality of cameras capturing the input images wherein said processor is configured to receive the input images form the one or a plurality of cameras.

21. The system according to claim 20 wherein said one or the plurality of cameras comprise at least one movable camera, and said processor is configured to perform calibration for the movable camera at each frame.

22. The system according to claim 11, wherein time series data of joint angles and joint positions is obtained by obtaining the joint angles and joint positions in each frame to capture the motion of the subject.

23. A non-transitory computer-readable storage medium which stores a program that causes a computer to execute a process, said process comprising:
- obtaining a spatial distribution of a likelihood of a position of each feature point in a body of a subject based on a single input image or a plurality of input images taken at the same time wherein said subject has a plurality of feature points including a plurality of joints and the input image is of a pose of the subject with an articulated structure comprising the plurality of joints;
- obtaining one or a plurality of position candidates corresponding to each feature point based on the spatial distribution of said likelihood of the position of each feature point;
- obtaining each joint angle by performing an optimization calculation based on inverse kinematics using said candidates and said articulated structure; and
- obtaining positions of the feature points including the joints by performing a forward kinematics calculation using said joint angles.

* * * * *